(12) United States Patent
Rennie et al.

(10) Patent No.: US 7,714,705 B2
(45) Date of Patent: May 11, 2010

(54) MAINTENANCE DECISION SUPPORT SYSTEM AND METHOD

(75) Inventors: Christopher J. Rennie, Seattle, WA (US); Kevin K. Groeneweg, Golden, CO (US)

(73) Assignee: IWAPI Inc., Golden, CO (US)

( * ) Notice: Subject to any disclaimer, the term of this patent is extended or adjusted under 35 U.S.C. 154(b) by 40 days.

(21) Appl. No.: 12/046,121

(22) Filed: Mar. 11, 2008

(65) Prior Publication Data

US 2008/0157943 A1 Jul. 3, 2008

Related U.S. Application Data

(63) Continuation of application No. 11/363,581, filed on Feb. 27, 2006, now Pat. No. 7,355,509.

(60) Provisional application No. 60/656,650, filed on Feb. 25, 2005.

(51) Int. Cl.
    *B60R 25/10* (2006.01)
(52) U.S. Cl. ............. 340/426.16; 340/905; 340/539.13; 340/995.13; 701/35; 701/29; 701/32
(58) Field of Classification Search ............ 340/426.16, 340/995.1, 905, 436, 573.4, 426.19, 438, 340/539.13, 995.13; 342/357.07; 701/50, 701/36, 301, 25, 29, 32; 239/172; 345/156
See application file for complete search history.

(56) References Cited

U.S. PATENT DOCUMENTS

| | | | |
|---|---|---|---|
| 3,160,964 A | 12/1964 | Boyer et al. | |
| 3,344,993 A | 10/1967 | Wilder et al. | |
| 3,420,451 A | 1/1969 | Kahlbacher | |
| 3,459,375 A | 8/1969 | Goffin | |
| 3,519,169 A | 7/1970 | Holland | |
| 3,540,655 A | 11/1970 | Hinrichs | |
| 3,559,894 A | 2/1971 | Murray et al. | |
| 3,655,130 A | 4/1972 | Patrick | |
| 3,776,421 A | 12/1973 | Harrison et al. | |
| 3,776,431 A | 12/1973 | Riley | |
| 3,856,206 A | 12/1974 | Bell et al. | |
| 3,891,979 A | 6/1975 | Braun et al. | |
| 3,995,569 A | 12/1976 | Picardat | |
| 4,052,003 A | 10/1977 | Steffen | |
| 4,077,139 A | 3/1978 | Fagervold et al. | |

(Continued)

FOREIGN PATENT DOCUMENTS

CA 2060418 5/1994

(Continued)

OTHER PUBLICATIONS

Dahlgren, LLC, 2004, available at http://www.dahlgrenllc.com/AboutUs.htm, accessed Jun. 10, 2009, 1 page.

(Continued)

*Primary Examiner*—Davetta W Goins
*Assistant Examiner*—Hoi C Lau
(74) *Attorney, Agent, or Firm*—Sheridan Ross P.C.

(57) ABSTRACT

A method and system are provided in which maintenance vehicles collect information from sensors and operators, forward the collected information to a server, and, in response, receive maps and operator instructions.

50 Claims, 14 Drawing Sheets

U.S. PATENT DOCUMENTS

| | | | |
|---|---|---|---|
| 4,084,748 A | 4/1978 | Anderson et al. |
| 4,176,791 A | 12/1979 | Cattaneo et al. |
| 4,209,065 A | 6/1980 | Ledent |
| 4,210,284 A | 7/1980 | Tarnay et al. |
| 4,230,280 A | 10/1980 | Leigh et al. |
| 4,234,109 A | 11/1980 | Goodhart |
| 4,260,107 A | 4/1981 | Jackson |
| 4,274,091 A | 6/1981 | Decker |
| 4,274,901 A | 6/1981 | Elber |
| 4,373,668 A | 2/1983 | Forbes et al. |
| 4,376,007 A | 3/1983 | Eigenmann |
| 4,391,393 A | 7/1983 | Filmyer |
| 4,422,562 A | 12/1983 | Rawson |
| 4,442,979 A | 4/1984 | Kupper |
| 4,473,319 A | 9/1984 | Spangler |
| 4,491,275 A | 1/1985 | Holsworth |
| 4,492,952 A | 1/1985 | Miller |
| 4,503,806 A | 3/1985 | Prusak et al. |
| 4,523,280 A | 6/1985 | Bachman |
| 4,529,336 A | 7/1985 | Shinozaki et al. |
| 4,553,702 A | 11/1985 | Coffee et al. |
| 4,577,781 A | 3/1986 | Braun |
| 4,588,127 A | 5/1986 | Ehrat |
| 4,678,056 A | 7/1987 | Kobari et al. |
| 4,684,062 A | 8/1987 | Bagwell |
| 4,690,553 A | 9/1987 | Fukamizu et al. |
| 4,700,223 A | 10/1987 | Shoutaro et al. |
| 4,700,895 A | 10/1987 | Takata |
| 4,733,760 A | 3/1988 | Inagaki et al. |
| 4,768,716 A | 9/1988 | Buchanan, Jr. et al. |
| 4,803,626 A | 2/1989 | Bachman et al. |
| 4,805,088 A | 2/1989 | Cross et al. |
| 4,809,197 A | 2/1989 | Tashiro et al. |
| 4,829,434 A | 5/1989 | Karmel et al. |
| 4,829,684 A | 5/1989 | Gruber |
| 4,881,371 A | 11/1989 | Haeder et al. |
| 4,898,333 A | 2/1990 | Kime et al. |
| 4,955,538 A | 9/1990 | Laube et al. |
| 4,984,163 A | 1/1991 | Kuwana et al. |
| 5,012,977 A | 5/1991 | Karklins et al. |
| 5,028,017 A | 7/1991 | Simmons et al. |
| 5,069,392 A | 12/1991 | Wise et al. |
| 5,096,125 A | 3/1992 | Wise et al. |
| 5,186,396 A | 2/1993 | Wise et al. |
| 5,267,696 A | 12/1993 | Balmer |
| 5,310,113 A | 5/1994 | Cowgur |
| 5,318,226 A | 6/1994 | Kime et al. |
| 5,331,331 A | 7/1994 | Wu |
| 5,334,987 A | 8/1994 | Teach |
| 5,343,744 A | 9/1994 | Ammann |
| 5,366,039 A | 11/1994 | Sawada |
| 5,386,727 A | 2/1995 | Searle |
| 5,416,475 A | 5/1995 | Tolbert et al. |
| 5,416,476 A | 5/1995 | Rendon |
| 5,439,312 A | 8/1995 | Marcato |
| 5,447,272 A | 9/1995 | Ask |
| 5,449,049 A | 9/1995 | Every |
| 5,452,966 A | 9/1995 | Swisher, Jr. |
| RE35,100 E | 11/1995 | Monson et al. |
| 5,469,371 A | 11/1995 | Bass |
| 5,515,043 A | 5/1996 | Berard et al. |
| 5,515,623 A | 5/1996 | Weeks |
| 5,521,594 A | 5/1996 | Fukushima |
| 5,603,452 A | 2/1997 | Hester |
| 5,606,307 A * | 2/1997 | Kuan ..................... 340/426.21 |
| 5,619,193 A | 4/1997 | Doherty et al. |
| 5,652,522 A | 7/1997 | Kates et al. |
| 5,653,389 A | 8/1997 | Henderson et al. |
| 5,684,476 A | 11/1997 | Anderson |
| 5,699,056 A | 12/1997 | Yoshida |
| 5,717,737 A | 2/1998 | Doviak et al. |
| 5,745,051 A | 4/1998 | Doherty et al. |
| 5,746,539 A | 5/1998 | Mara |
| 5,774,070 A | 6/1998 | Rendon |
| 5,796,344 A | 8/1998 | Mann et al. |
| 5,818,339 A | 10/1998 | Giles et al. |
| 5,844,473 A | 12/1998 | Kaman |
| 5,904,296 A | 5/1999 | Doherty et al. |
| 5,928,504 A | 7/1999 | Hembre et al. |
| 5,931,393 A | 8/1999 | Alsip et al. |
| 5,931,882 A | 8/1999 | Fick et al. |
| 5,947,391 A | 9/1999 | Beck et al. |
| 5,947,931 A | 9/1999 | Bierman |
| 5,952,565 A | 9/1999 | Huber et al. |
| 5,955,973 A | 9/1999 | Anderson |
| 5,957,621 A | 9/1999 | Clark, Jr. et al. |
| 5,982,325 A * | 11/1999 | Thornton et al. ....... 342/357.07 |
| 6,012,012 A | 1/2000 | Fleck et al. |
| 6,029,111 A | 2/2000 | Croyle |
| 6,064,970 A | 5/2000 | McMillan et al. |
| 6,089,743 A | 7/2000 | McQuinn |
| 6,092,745 A | 7/2000 | Seymour et al. |
| 6,131,136 A | 10/2000 | Liebenow et al. |
| 6,166,627 A | 12/2000 | Reeley |
| 6,166,657 A | 12/2000 | Mann |
| 6,173,904 B1 | 1/2001 | Doherty et al. |
| 6,198,920 B1 | 3/2001 | Doviak et al. |
| 6,236,365 B1 | 5/2001 | LeBlanc et al. |
| 6,236,907 B1 | 5/2001 | Hauwiller et al. |
| 6,236,933 B1 | 5/2001 | Lang |
| 6,246,938 B1 | 6/2001 | Giletta et al. |
| 6,253,129 B1 | 6/2001 | Jenkins et al. |
| 6,317,684 B1 | 11/2001 | Roeseler et al. |
| 6,330,499 B1 | 12/2001 | Chou et al. |
| 6,354,786 B1 | 3/2002 | Feller |
| 6,356,823 B1 | 3/2002 | Iannotti et al. |
| 6,377,881 B1 | 4/2002 | Mullins |
| 6,384,739 B1 | 5/2002 | Roberts |
| 6,418,324 B1 | 7/2002 | Doviak et al. |
| 6,429,773 B1 | 8/2002 | Schuyler |
| 6,429,812 B1 | 8/2002 | Hoffberg |
| 6,470,272 B2 | 10/2002 | Cong et al. |
| 6,472,982 B2 | 10/2002 | Eida et al. |
| 6,497,368 B1 | 12/2002 | Friend et al. |
| 6,535,141 B1 | 3/2003 | Doherty |
| 6,538,578 B1 | 3/2003 | Doherty |
| 6,546,425 B1 | 4/2003 | Hanson et al. |
| 6,556,899 B1 | 4/2003 | Pachet et al. |
| 6,567,035 B1 | 5/2003 | Elliott |
| 6,587,785 B2 | 7/2003 | Jijina et al. |
| 6,611,739 B1 | 8/2003 | Harvey et al. |
| 6,611,740 B2 | 8/2003 | Lowrey et al. |
| 6,631,322 B1 | 10/2003 | Arthur et al. |
| 6,640,187 B1 | 10/2003 | Chenault et al. |
| 6,647,270 B1 | 11/2003 | Himmelstein |
| 6,650,252 B2 | 11/2003 | Miller, Jr. |
| 6,700,493 B1 | 3/2004 | Robinson |
| 6,714,857 B2 | 3/2004 | Kapolka et al. |
| 6,732,032 B1 | 5/2004 | Banet et al. |
| 6,738,697 B2 | 5/2004 | Breed |
| 6,745,153 B2 | 6/2004 | White et al. |
| 6,791,456 B2 | 9/2004 | Nakayama et al. |
| 6,791,472 B1 | 9/2004 | Hoffberg |
| 6,801,837 B2 | 10/2004 | Carlstedt et al. |
| 6,804,602 B2 | 10/2004 | Impson et al. |
| 6,826,405 B2 | 11/2004 | Doviak et al. |
| 6,885,874 B2 | 4/2005 | Grube et al. |
| 6,919,821 B1 | 7/2005 | Smith |
| 6,938,829 B2 | 9/2005 | Doherty et al. |
| 6,950,013 B2 * | 9/2005 | Scaman et al. .............. 340/436 |
| 6,950,022 B2 | 9/2005 | Breed |
| 6,952,181 B2 | 10/2005 | Karr et al. |
| 6,977,597 B2 | 12/2005 | Doherty |
| 6,981,047 B2 | 12/2005 | Hanson et al. |

| | | | |
|---|---|---|---|
| 6,988,033 B1 | 1/2006 | Lowrey et al. | |
| 7,027,915 B2 | 4/2006 | Craine | |
| 7,064,657 B2 | 6/2006 | Becker et al. | |
| 7,084,775 B1* | 8/2006 | Smith | 340/601 |
| 7,085,382 B2 | 8/2006 | Terao et al. | |
| 7,117,075 B1* | 10/2006 | Larschan et al. | 701/35 |
| 7,138,916 B2* | 11/2006 | Schwartz et al. | 340/572.1 |
| 7,164,365 B2 | 1/2007 | Doherty et al. | |
| 7,268,703 B1* | 9/2007 | Kabel et al. | 340/984 |
| 7,355,509 B2* | 4/2008 | Rennie et al. | 340/426.16 |
| 7,386,392 B1* | 6/2008 | Kabel et al. | 701/200 |
| 7,400,267 B1 | 7/2008 | Doherty et al. | |
| 7,421,334 B2 | 9/2008 | Dahlgren et al. | |
| 2001/0045891 A1 | 11/2001 | Nakao et al. | |
| 2002/0122394 A1 | 9/2002 | Whitmore et al. | |
| 2002/0193938 A1 | 12/2002 | DeKock et al. | |
| 2003/0058216 A1* | 3/2003 | Lacroix et al. | 345/156 |
| 2003/0125073 A1 | 7/2003 | Tsai et al. | |
| 2004/0105608 A1 | 6/2004 | Sloman | |
| 2004/0138790 A1 | 7/2004 | Kapolka et al. | |
| 2004/0170181 A1 | 9/2004 | Bogdon et al. | |
| 2004/0195357 A1* | 10/2004 | Doherty et al. | 239/172 |
| 2004/0203436 A1 | 10/2004 | Oesterling | |
| 2004/0224668 A1 | 11/2004 | Shell et al. | |
| 2004/0264402 A9 | 12/2004 | Whitmore et al. | |
| 2005/0002419 A1 | 1/2005 | Doviak et al. | |
| 2005/0020308 A1 | 1/2005 | Lai | |
| 2005/0043019 A1 | 2/2005 | Nakamura et al. | |
| 2005/0066033 A1 | 3/2005 | Cheston et al. | |
| 2005/0192725 A1* | 9/2005 | Li | 701/36 |
| 2005/0197775 A1* | 9/2005 | Smith | 702/3 |
| 2005/0198257 A1 | 9/2005 | Gupta et al. | |
| 2005/0203683 A1 | 9/2005 | Olsen et al. | |
| 2005/0223114 A1 | 10/2005 | Hanson et al. | |
| 2005/0223115 A1 | 10/2005 | Hanson et al. | |
| 2005/0243857 A1 | 11/2005 | Hofstaedter et al. | |
| 2005/0246088 A1 | 11/2005 | Doherty et al. | |
| 2006/0009213 A1 | 1/2006 | Sturniolo et al. | |
| 2006/0022846 A1* | 2/2006 | Tummala | 340/995.1 |
| 2006/0023676 A1 | 2/2006 | Whitmore et al. | |
| 2006/0046716 A1 | 3/2006 | Hofstaedter et al. | |
| 2007/0265780 A1 | 11/2007 | Kesler et al. | |
| 2007/0296574 A1* | 12/2007 | Smith et al. | 340/539.13 |
| 2008/0251614 A1 | 10/2008 | Doherty et al. | |
| 2009/0173839 A1 | 7/2009 | Groeneweg et al. | |

FOREIGN PATENT DOCUMENTS

| | | |
|---|---|---|
| CA | 2233689 | 4/1997 |
| CA | 2272541 | 5/1998 |
| CH | 516050 | 11/1971 |
| DE | 3506229 | 8/1986 |
| DE | 3712452 | 11/1988 |
| FR | 2229812 | 12/1974 |
| FR | 2378132 | 8/1978 |
| FR | 2618543 | 1/1989 |

OTHER PUBLICATIONS

Hoffberg, "Information Collection System for Traffic Mapping, has Mobile Units with Communication Device Communicating Traffic Information with Central Monitoring Station and Prioritized Information with Corresponding Mobile Unit," Derwent, Sep. 14, 2004, 2 Pgs, (Believe to correspond to U.S. 6791472 disclosed herein).

North American Light Rail Terminology, Jun. 7, 2008, available at http://www.lightrail.com/terminology.htm, accessed Dec. 20, 2008, 26 pages.

Zoom: Driving Transportation Informatics, available at http://www.zoominfosystems.com/, accessed Jun. 10, 2009, 1 page.

International Search Report for International (PCT) Application No. PCT/US08/88670, mailed Mar. 6, 2009.

Written Opinion for International (PCT) Application No. PCT/US08/88670, mailed Mar. 6, 2009.

International Report on Patentability for International Application No. PCT/US2007/062751, issued Sep. 2, 2008.

Background of the Invention for the above-captioned application (previously provided).

Campbell, Susan J., "TotalRoam Proves Successful Enough for Expansion in Three Organizations," Available at http://www.tmcnet.com/news/2006/02/14//1371250.htm, Feb. 14, 2006, 7 pages.

Declaration of Kevin K. Groeneweg Under 37 CFR Section 1.98 (15 pgs.), including Exhibits A (10 pgs.), and B (1 pg.).

Junxion, Inc., "Field Commander junxion box remote management", Junxion, Inc., Seattle WA, 2005-2006, 1 page.

Junxion, Inc., "Junxion Box, User Guide", Model JB-110b (Wi-Fi and Ethernet LAN), Firmware Version 1.3, User Guide Revision B, Junxion, Inc., Seattle WA, 2004-2005, 48 pages.

Junxion, Inc., "Junxion Box, User Guide", Model JB-110e (Ethernet LAN only), Firmware Version 1.3, User Guide Revision A, Junxion, Inc., Seattle WA, 2004-2005, 44 pages.

Junxion, Inc., "Junxion Box; device durability testing", Junxion, Inc., Seattle WA, 2005-2006, 1 page.

Junxion, Inc., "Junxion Box; wireless WAN router", Junxion, Inc., Seattle WA, 2004-2006, 2 pages.

Junxion, Inc., "Junxion Complete; turn-key WWAN solutions", Junxion, Inc., Seattle WA, 2005-2006, 1 page.

Junxion, Inc., "Why Junxion? five reasons to consider", Junxion, Inc., Seattle WA, 2005-2006, 1 page.

Manpage of PPP, "PPPD", Available at http://iie.fing.edu.uy/ense/redatos/links/lab4/pppd.html, Aug. 3, 2005, 24 pages.

Mobile Competency, "Total Roam; The Business Case for Connection Persistence in Enterprise Wireless", White Paper prepared for Padcom, Mobile Competency Inc., Providence RI, 2005, 4 pages.

NetMotion Wireless Inc., "Best Practices for Wireless CRM", NetMotion Wireless Inc., Seattle WA, 2004, 5 pages.

NetMotion Wireless Inc., "Mobiity XE; Get Connected. Stay Connected.", NetMotion Wireless Inc., Seattle WA, 2005, 6 pages.

NetMotion Wireless Inc., "Mobility XE Compatibility Guide", Available at http://www.netmotionwireless.com/resources/compatibility.asp, 2005, 2 pages.

NetMotion Wireless Inc., "NetMotion Mobility XE and Mobile IP", Available at http://www.netmotionwireless.com/lib/PrintPage.asp?REF=, 2005, 4 pages.

NetMotion Wireless Inc., "NetMotion Mobility XE Link Optimization for Wireless WANs", NetMotion Wireless Inc., Seattle WA, 2005, 5 pages.

NetMotion Wireless Inc., "NetMotion Mobility XE Scalability", NetMotion Wireless Inc., Seattle WA, 2005, 6 pages.

NetMotion Wireless Inc., "Policy Management Module", Available at http://www.netmotionwireless.com/product/info/policy_mgt_sheet.asp, 2005, 3 pages.

NetMotion Wireless Inc., "Technical Overview for Network Administrators", NetMotion Wireless Inc., Seattle WA, 2005, 9 pages.

NetMotion Wireless Inc., "The Key to Mobility", Available at http://www.netmotionwireless.com/products/mobility_keys.asp, 2005, 5 pages.

NetMotion Wireless Inc., "What's New in Mobility XE", Available at http://www.netmotionwireless.com/product/whatsnew_663.asp, 2005, 10 pages.

NetMotion Wireless Inc., "Wireless LANs: The Essentials for Saving Your Sanity", NetMotion Wireless Inc., Seattle WA, 2004, 6 pages.

NetMotion Wireless Inc., "Wireless Wide Area Networks: Trends and Issues", NetMotion Wireless Inc., Seattle WA, 2005, 6 pages.

Padcom Inc., "6100 Remote Access Router", Available at http://www.padcomusa.com/remote-access-router-6100.shtml, undated, 1 page.

Padcom Inc., "8100 Remote Access Router", Available at http://www.padcomusa.com/remote-acess-router-8100.shtml, undated, 2 pages.

Padcom Inc., "CDPD to Public Next-Generation Networks: Understanding the Transition", Padcom Inc., Bethlehem, PA, 2005, 8 pages.

Padcom Inc., "Point of Service Architecture", Available at http://www.padcomusa.com/rar-architecture-pos.shtml, undated, 1 page.

Padcom Inc., "Products; How TotalRoam Works", Available at http://www.padcomusa.com/products-how-tr-works.shtml, undated, 2 pages.

Padcom Inc., "Products; TotalRoam Connect; Mobile VPN", Available at http://www.padcomusa.com/products-tr-connect.shtml, undated, 3 pages.

Padcom Inc., "Products; TotalRoam Mobile Virtual Network (MVN)", Available at http://www.padcomusa.com/products-totalroam-mvn.shtml, undated, 4 pages.

Padcom Inc., "Remote Access Routers", Available at http://www.padcomusa.com/remote-access-routers.shtml, undated, 1 page.

Padcom Inc., "TotalRoam; Technical Overview", Padcom Inc., Bethleham, PA, 2005, 42 pages.

Padcom Inc., "Use Case Scenario: POS", Available at http://www.padcomusa.com/rar-scenario-pos.shtml, undated, 1page.

Padcom Inc., "Use Case Scenario: Van", Available at http://www.padcom.com/rar-scenario-van.shtml, undated, 1 page.

Padcom Inc., "Vehicle Area Network Architecture", Available at http://www.padcomusa.com/rar-architecture-van.shtml, undated, 1 page.

PCT Application No. PCT/US07/62751, combined International Search Report and Written Opinion (Nov. 8, 2007).

"µWEBox Lite GSM/GPRS (GPS)—Revision 1.2", Comtech M2M, date unknown, pp. 1-60.

"µWEBox Lite Product FAmily", Comtech M2M, 2004, pp. 1-60.

"BlueTree Wireless Data—Wireless Modems", printed Jan. 4, 2007, pp. 1-4.

"GPRS GPS modem GPS GPRS modems—Comtech M2M", available at http://www.comtechm2m.com/gprs-modem/gprs-gps-modem.htm, printed Jan. 4, 2007, pp. 1-4.

"GPS Information", available at http://www.alltrackusa.com/gps_info.html, printed Jan. 4, 2007.

"GPS Tracking, GPS Vehicle Tracking products for monitoring of teen drivers", available at http://www.alltrackusa.com/, printed Jan. 4, 2007, pp. 1-4.

"GPS Wireless Modem—KnowledgeStorm Wireless Results for GPS Wireless Modem", printed Jan. 4, 2007, pp. 1-5.

"GPS-150 Automatic Vehicle Location Unit", CES Wireless Technologies Brochure, Jan. 9, 2003, 11 pages.

"Sierra offers GPS wireless modem", Globe Technolgy.com, Sep. 9, 2003, 1 page.

"TransCore Set to Develop DSRC, GPS, and Satellite Combined Communications Modem; Move Will Merge Disparate Telematics Technologies into One Device for In-Vehicle Safety Applications", Business Wire, Nov. 7, 2005, pp. 1-4.

"Ulster County Sheriff Media Release", dated Nov. 17, 2006, pp. 1-8.

"Using GPS for Vehicle Tracking, Asset Tracking and Fleet Management", available at http://www.cjseymour.plus.com/gps/gps.htm, dated Mar. 22, 2006, pp. 1-11.

"Vehicle Tracking Technology", available at http://www.trackmyvehicle.com/locate_technology.asp, printed Jan. 4, 2007, 2 pages.

Falkenberg et al., "Precise Real-Time Kinematic Differential GPS Using a Cellular Radio Modem", Nov Atel Communications Ltd., presented at the IEEE Position Location an dNavigation Symposium PLANS 92, Monterey, CA, Mar. 24-27, 1992.

Ortega et al., "Development of an In-House Automated Vehicle Location System", Proceedings of the 2003 Mid-Continent Transportations Research Symposium, Ames, Iowa, August 2003, 7 pages.

Xie et al., "Going beyond automatic vehicle location" Nov. 2004, 10 pages.

Automatic Vehicle Locator System, Feb. 18, 2006, 1 page.

"Better bridge deicing on the way?" Better Roads, Jun. 1995, 1 page.

"Cellular technology has new niche, Phones offer mobile control in rural Colorado," by Dinah Zeiger, Denver Post, Aug. 21, 1994, 2 pages.

"Concept Highway Maintenance Vehicle, Final Report: Phase One," Apr. 1997, CTRE, pp. 1-92.

"Developments Improve Road Weather Information Systems," Betters Roads, pp. 21 and 24 available, Oct. 1995.

"GIS: The World's ITS Backbone", Case Study, Environmental Systems Research Institute, Inc. 4 pages, 1997.

"Innovations in ITS," ITE Journal, Dec. 1996, 3 pages.

"ITS applications for magnetic tape", ITS: Intelligent transport systems, Jan./Feb. 1997, 1 page.

"Magnetic strips make snow ploughs smarter", ITS: Intelligent transport systems, Jan./Feb. 1997.

"Maintenance Management and Winter Operations," Transporation Research Record No. 1533, Transportation Research Board, 1996, 7 pages.

"Maintenance Management, Traffic Safety, and Snow Removal," Transportation Research Record No. 1352, Transportation Research Board, 1992, 92 pages.

"McCaw's AirData Network Gets Wheels; Showcases First CDPD-enabled Mobile Office Van from the Streets of Las Vegas at COMDEX/Fall '94", Business Wire, Nov. 14, 1994, pp. 1-2.

"Measuring Salt's Effectiveness in New York," Better Roads, Jan. 1995, 1 page.

"Our Mission: Traveler Services; 100% accurate, anywhere, anytime," VDOT Mar. 3, 2006, 16 pages.

"OutFront—What's Happening in the World of ITS—Study Predicts $400 billion market for ITS over the next 20 years" date unknown, 1 page.

"Phase Two Concept Highway Maintenance Vehicle Work Plan", Appendix G, Prepared by the Center for Transportation Research and Education, Ames, IA, Oct. 1996, 10 pages.

"Riding the Data Highway," Newsweek, p. 97, Mar. 21, 1994.

"Roads Report," edited by Larry Flynn, Roads & Bridges, Mar. 1993, 1 page.

"Rockwell rolls out DataTrax/GPS onboard computer with built-in GPS. (Rockwell Transportation Electronics; Global Positioning System)," Satellite News, Nov. 6, 1995, pp. 1-2.

"RWIS helps snow and ice control," Better Roads, Sep. 1994, 1 page.

"Snow and Ice Control: A Best Practices Review," May 1995, Office of the Legislative Auditor State of Minnesota, pp. 1-148.

"Snow Plowing goes high Tech," CTRE, Aug. 1997, pp. 1-16.

"Snow Removal and Ice Control Technology," Transportation Research Board, Conference Proceedings 16, 1996 pp. 1-174.

Southeast Michigan Snow and Ice Management (SEMSIM), Final Evaluation at End of Winter Season Year 2004, Aug. 1, 2004, 90 pages.

"Technology Transfer—NHI Reinforces Its Partnerships with Industry", Nov. 1996 Transporter, http://www.tfhrc.gov/trnsptr/rttnov96/rd961109.htm, accessed Nov. 2, 2009 2 pages.

"The Wisconsin DOT used an ice detection system and a snow forecasting model to aid in the dispatch of snow plows and deicers saving 4 hours per person for each significant storm (a value of around $144,000/storm), and approximately $75,000 in salt," RITA: Intelligent Transportation Systems, Mar./Apr. 1990, abstract only, 1 page.

"Traffic Sensor System," Better Roads, Dec. 1995, p. 15.

"UK proposes three private traffic control centres", ITS: Intelligent transport systems, Jan./Feb. 1997, 1 page.

"Water, Pure and Simple," Discover, pp. 87-88, Jul. 1996.

"Wetlands and road construction: Like Oil and Water?" Technology News, Aug.-Sep. 1997, pp. 1-12.

"What is a Road Weather Information System (RWIS)?" Road Weather Management Program, printed Oct. 30, 2009, 2 pages.

"Winter Maintenance for the New Millennium," U.S. Department of Transportation, Federal Highway Administration, Oct. 1998, pp. 1-4.

"Winter Maintenance Technology and Practices—Learning from Abroad," Research Results Digest, No. 204, Jan. 1995, NCHRP, pp. 1-16.

"Winter Maintenance Technology and Practices—Learning from Abroad," Road Management & Engineering Journal, Mar. 1, 1997, TranSafety, Inc., pp. 1-9.

1997 APWA North American Snow Conference, Apr. 27-30, 1997, Kansas City, Missouri, pp. 1-22.

Appendix C, Research Funding Sources, 1996, 4 pages.

Appendix C: Motor Carrier Case Study, Evaluation Report vol. II—Case Study Field Notes by Western Highway Institute, ATA Foundation, Feb. 1994, pp. 1-108.

Appendix D, Select Private Sector Partners, 1996, 19 pages.

Appendix E, Develop Description of Systems, 1996, 6 pages.

Axelson, "Winter Road Maintenance System," Pennsylvania Department of Transportation, Maintenance Management, Conference Proceedings 5, Transportation Research Board,1995, pp. 63-65.

Banasiak, "Snowfighters gather in Salt Lake City," Roads & Bridges, Jun. 1996, pp. 1-2.
Boselly et al., "Road Weather Information Systems vol. I: Research Report," Strategic Highway Research Program, Sep. 1993, pp. 1-219.
Boselly et al., "Road Weather Information Systems vol. II: Implementation Guide," Strategic Highway Research Program, Sep. 1993, pp. 1-82.
Bowman, Supplemental Advance Warning Devices: A Synthesis of Highway Practice, NCHRP Synthesis of Highway Practice, Issue No. 186, 1993, 92 pages.
Brochure, "Artificial Intelligence/Expert Systems," Kaman Sciences Corporation, Copyright 1991, 2 pages.
Brochure, "Facts About Southwest Research Institute," Southwest Research Institute, San Antonio, Texas. Annual Report from Southwest Research Institute, 1996, 2 pages.
Brochure, "KEMS . . . A Geographic Information System Tailored for Emergency Management Applications," Kaman Sciences Corporation. Article, "Measuring Salt's Effectiveness in New York," Better Roads, Jan. 1995., 4 pages.
Brochure, "Solving Today's Problems for Tomorrow's Safety," Control Products, Inc., date unknown, 2 pages.
Brochure, Enator Telub AB, "Mobile Road Condition Monitoring," Appears to be available as early as 1998.
Brochure, Southwest Research Institute—Guide, 8 pages, Aug. 1996.
Brochure, Southwest Research Institute—Guide, 8 pages, Jan. 1998.
Brown et al., "A Technical Report to the Secretary of Transportation on a National Approach to Augmented GPS Services," Dec. 1994, pp. 1-177.
Chollar, "Revolution in Winter Maintenance," U.S. Department of Transportation, Federal Highway Administration, Winter 1996, vol. 59, No. 3, 3 pages.
Clarus Initiative, Read Ahead Package for Clarus Initiative Coordinating Committee Meeting #4, Aug. 8-9, 2006, Falls Church, VA, pp. 1-33.
Concept Paper, Northern Virginia Transportation Management Program: Enhancements for Incident Response and Emergency Operations Command/Control and Information Sharing, Jan. 25, 2001, 4 pages.
Crosby "Visibility a Key Component of Weather Systems,", Feedback on article, "Managing Winter Weather", Dec. 1996, 1 page.
Cumberledge et al., "Integration of Management Systems for Maintenance Activities," Pennsylvania Department of Transportation, Maintenance Management, Conference Proceedings 5, Transportation Research Board, 1995, pp. 26-30.
Dawley et al., "Ergonomic Factors in a one-person operation of snow plows with attached wing plows," Presentations from the 10th Equipment Management Workshop, Portland, OR, 1994, pp. 37-41.
Draft Proposal, Policy Recommendations to the RAQC Concerning the Comprehensive Long Range Air Quality Plan, from the Street Sanding/Cleaning Subcommittee City of Aurora Public Works Dept. (Colorado), Nov. 1, 1995, 2 pages.
Environmental Monitoring System (EMS), IPS MeteoStar, printed Oct. 30, 2009, 4 pages.
Excerpts from America Online: KKlean, Jun. 30, 1995, 6 pages.
Flanagan, "The Virtual Consolidated Operations Center," pp. 1-20, 1995.
Fleege "Equipment in Scandinavian Countries", Presentations from the 10th Equipment Management Workshop, Portland, OR, 1994, pp. 105-108.
Fleege et al., "Spreader Equipment for Anti-Icing", Maintenance Management and Safety, Transportation Research Record No. 1509, Transportation Research National Research Council, 1995, pp. 22-27.
GL 400 Spreader Control Presentation, Component Technology, Oct. 25, 1997, 12 pages.
Goodwin, "Best Practices for Road Weather Management," May 2003, pp. 1-131.
Hanbali et al., "Traffic Volume Reductions due to Winter Storm Conditions," Transportation Research Record 1387, 1993, pp. 159-164.
Highway Capacity Manual, Chapter 22: Freeway Facilities, 2000, 68 pages.

Hudson, "Let it Snow, let it snow, let it snow: 11 ways to maintain winter roads," http://americancityandcounty.com/mag/government_let_snow_let/, Apr. 1, 1996.
Hunter "1994 Midwestern States Equipment Management Conference" Presentations from the 10th Equipment Management Workshop, Portland, OR, 1994, pp. 111-113.
Hunter, "Snow Plow Trucks—Specifications for the Twenty-First Century," Presentations from the 10th Equipment Management Workshop, Portland, OR, 1994, pp. 31-35.
Hyman et al., "Field Testing and Evaluation of Innovative Technologies for Maintenance Data Collection," Transportation Research Board Conference Proceedings, 1995, No. 5, pp. 9-17.
ITIB Major IT Project Status Report for Jan. 2009—Summary, 9 pages.
Lasky et al., "Automated Highway Systems (AHS) Classification by Vehicle and Infrastructure," Advanced Highway Maintenance & Construction Technology Research Center, Jan. 25, 1994, 65 pages.
Manfredi et al., "Road Weather Information System Environmental Sensor Station Siting Guidelines," Report No. FHWA-HOP-05-026, Federal Highway Administration, Apr. 2005, U.S. Department of Transportation, 52 pages.
Manfredi et al., "Road Weather Information System Environmental Sensor Station Siting Guidelines," Version 2.0, Nov. 2008, U.S. Department of Transportation, 71 pages.
Marketing Document, Didactics Incorporated, "IR Applications for Ice and Snow Control," 1998, 29 pages.
Markow et al., "Highway Maintenance and Integrated Management Systems, " Transportation Research Board Conference Proceedings, 1995, No. 5, pp. 31-37.
Montagne et al., "Oregon Green Light CVO Evaluation, Final Report, Detailed Test Plans 2 and 3, Evaluation of the Road Weather Information System (RWIS)" Jun. 2000, 89 pages.
Nixon "Foreign Technology Applications for the Winter Maintenance Concept Vehicle," Iowa Institute of Hydraulic Research, 1996, Appendix F, Foreign Technology Applications Report, 16 pages.
Pell, "An Improved Displacement Snowplow," Strategic Highway Research Program, May 1994, pp. 1-93.
Peterson, "Snow Plow Truck Cab Ergonomics: Summary," Presentations from the 10th Equipment Management Workshop, Portland, OR, 1994, p. 36.
Pilli-Sihvola et al., "Road weather service system in finland and savings in driving costs," Transportation Research Record No. 1387, 1992, pp. 196-200.
Pisano et al., "Intelligent Transportation Systems and Winter Operations in Japan," Sep. 2003, pp. 107.
Press releases and product launches 2009, Vaisala to launch Road Weather Decision Support Sytem technologies, Jul. 9, 2009, 1 page.
Rasmussen, Erik; "Mobile Doppler Radar: A new tool to investigate tornadic storms"; NSSL Briefings; Fall/Winter 1995; pp. 10-11.
Reiter et al., "Artificial Intelligence-supported weather prediction for highway operations," Strategic Highway Research Program, 1992, p. 49, Abstract only.
Reiter et al., "Detailed weather prediction system for snow and ice control," Transportation Research Board, 1387, 1993, pp. 223-230.
Report on the 1998 Scanning Review of European Winter Service Technology, National Cooperative Highway Research Program, Research Results Digest, Apr. 1999, No. 238, 34 pages.
Road Condition-Weather Monitor: System to Determine Pavement Surface and Atmospheric Conditions, North Dakota DOT, 1 page, Sep. 1997.
Roosevelt et al., "Final Report: Lessons Learned from a Pilot Project of an Automatic Vehicle Location System in an Urban Winter Maintenance Operations Setting," Virginia Transportation Research Council, Apr. 2002, pp. 1-17.
SAIL 2 Evaluation, Mn/DOT Contract No. 86353, Jan. 2007, 50 pages.
Smith, "A new paradigm for winter maintenance decisions," 1998 Transportation Conference Proceedings, pp. 1-4.
Smith, "From Concept to Reality: Advanced Technology and the Highway Maintenance Vehicle," Presentations from the 12th Equipment Management Workshop, 1998, pp. 4-14.

Smithson, "AASHTO's Winter Maintenance Program: A Proactive Approach to International Technology Transfer," Iowa Department of Transportation, pp. 15-21.

Smithson, "Americans can Learn a Lot from European, Japanese Snowfighters," Roads & Bridges, pp. 30-32 available, Jun. 1995.

Smithson, "DOTs push for better snow control vehicles," Better Roads, Jun. 1997, pp. 27-29.

Smithson, "Japanese and European Winter Maintenance Technology", Pennsylvania Department of Transportation, Maintenance Management, Conference Proceedings 5, Transportation Research Board, 1995, pp. 66-68.

Snow Removal and Ice Control Technology: selected papers presented at the Fourth International Symposium, Reno, Nevada, Aug. 11-16, 1996, Transportation and Research Board, published 1997, ps 1-174.

Snowbreak Forest Book—Highway Snowstorm Countermeasure Manual, FHWA-PL-97-010, Japanese Original Printed Mar. 1990, Translated from Japanese, 1996, 107 pages.

Stern et al., "Vehicles as Mobile Sensing Platforms for Critical Weather Data," Briefing for the VII Weather Applications Workshop #1, Feb. 22, 2006, National Center for Atmospheric Research, Boulder, CO, pp. 1-35.

Surface Patrol™, available at http://www.ae-traffic.com/Surface_Patrol.html, printed Oct. 30, 2009, pp. 1-3.

Takeuchi et al., "Variation in motorist visual range measured by vehicle-mounted sensor," Transportation Research Record, 1387, 1993, pp. 173-177.

Task 9 Automatic Vehicle Locating System (AVL) Pilot Program for Snow Removal Operations, End of Program Report, Final, May 10, 2000, 17 pages.

The Intelligent Vehicle, May 1997, 1 page, printed Feb. 5, 2010.

Third International Symposium on Snow Removal and Ice Control Technology, Minneapolis, Minnesota, Sep. 14-18, 1992. Preprints: vol. 1 and vol. 2, Abstract only.

Thornes, "Cost-Effective Snow and Ice Control for the 1990s," Snow Removal and ice Control Technology, Transportation Research Record No. 1387, 1993, 7 pages.

Vaisala Guardian, "Road Weather Information Systems,", printed Oct. 30, 2009, 1 page.

Vaisala Guardian, The most effective and affordable road weather information system for cities, towns and counties, printed Oct. 30, 2009, 3 pages.

Vaisala U.S. National Lightning Detection Network, printed Oct. 30, 2009, 1 page.

VDOT VOIS/Weather Information Processing and Distribution (Inventory Element), Virginia.gov, printed Oct. 30, 2009, 4 pages.

Viking '79 Rover Study Final Report, vol. I, Summary, vol. II, Detailed Technical Volume, NASA CR-132417, Martin Marietta Corporation, Mar. 1974, 4 pages.

Zeyher, "Just Drive!," Roads & Bridges, Apr. 2002, 3 pages.

* cited by examiner

| Vendor Code | Product ID | Connection Monitor ID |
|---|---|---|
| AAAAA | llllll | aaaa |
| BBBBB | zzzzzz | bbbb |
| ⋮ | ⋮ | ⋮ |
| NNNNNN | xxxxxx | nnnn |

MAINTENANCE DECISION SUPPORT SYSTEM AND METHOD

CROSS REFERENCE TO RELATED APPLICATION

The present application is a continuation of U.S. application Ser. No. 11/363,581, filed on Feb. 27, 2006 now U.S. Pat. No. 7,355,509 which claims the benefits of U.S. Provisional Application Ser. No. 60/656,650, filed Feb. 25, 2005, having the same title, both of which are incorporated herein by this reference.

FIELD OF THE INVENTION

The invention relates generally to modems used in stationary and mobile applications and particularly to intelligent modems for collecting selected vehicular information.

BACKGROUND OF THE INVENTION

Modems today have changed little in the last 25 years. Typical modems offer little if any processing power and can only be used with a given technology, network or connection. The processing power, if any, is typically limited and of little practical use in many applications today. Such modems do not support full operating systems, and offer the user limited, if any, programming flexibility. Changes as simple as network password changes have required the modems to be uninstalled and sent to the manufacture for reprovisioning. Such modems are not SOAP XML Web Services compatible and cannot take data from a given data source and convert and send it in the now common XML format. They also are not modular—if any given component fails, if there is a change in communications carriers, or if a given communication carrier phases out one technology and migrates to another (as with the migration by the former ATT Wireless from CDPD to GPRS), the modem typically has to be replaced—they are not modular in nature and given components cannot be easily and cheaply replaced. These limitations become especially acute and cost prohibitive in telemetric and other applications where the modem must operate without manual intervention and/or in series with other equipment which has no or limited processing power (i.e. other "dumb" devices). For whatever the reason, not the least of which is pricing pressures, much of the equipment used for example in industry, security, telemetric, and intelligent transportation systems, carry little onboard processing power and/or require a separate laptop or other computer to operate, download and/or forward the applicable information. The addition of such laptops and other external computers is generally either impractical (such as in unmanned and roadside applications) or cost prohibitive (generally doubling or more the cost of the modem itself). Furthermore, any given user may need connectivity for equipment located in different carrier service areas and/or with different types of connections (e.g. different wireless carriers, network connections, fiber connections, etc) and multiple types of data sources and inputs (multiple serial and USB inputs, as well as potentially video, sound, etc.). For national and international applications, and even applications on statewide and local levels, flexibility in communication options and data collection options is important, as is the ability of the user to program the modem, add network security, store and forward data, and transfer the information in XML format via SOAP XML Web Services and/or such other format as their systems require. The ability to receive and process dynamic instructions is also important but often missing or severely limited, and traditional modems do not enable the type of remote access and upgrades (complete operating systems and applications) that are necessary to collect data and/or communicate with disparate equipment in use today and newer equipment ever being developed and deployed.

Associated security measures further punctuate the need for greater flexibility and power in the modems. For example, dynamic IP addresses are being deployed in many contexts including by wireless commercial carriers in their 3G and beyond wireless data services. Dynamic IP's present a significant departure from the static IP's associated with historic poling practices and wireless CDPD functionality which had been the mainstay of wireless data collection prior to the advent of 3G functionality. Again, the ability to add intelligence to the modem, and to enable greater programming and application support becomes important to enable the otherwise "dumb" devices to return their new IP addresses and thus facilitate remote access and/or to transmit data and information back on an automated push (instead of pull) basis. Therefore, a need exists for a more powerful and flexible modem device that can be more easily programmed, that carries greater processing and storage capabilities, that can take various data feeds, that does not require a separate laptop or other computer to function, and that can readily and interchangeably work with a variety of communication connections and options. A tremendous need exists for a new modem device with sufficient flexibility and power to be used with relative ease in the various situations.

SUMMARY OF THE INVENTION

These and other needs are addressed by the various embodiments and configurations of the present invention. The present invention is directed generally to collecting selected types of information in vehicular and roadside applications and transmitting at least some of the collected information to a remote server.

In a first embodiment of the invention, a data collection and transmission method is provided that includes the steps:

(a) a sensor and/or user interface collecting information regarding vehicle state and/or vehicle occupants;

(b) a slot receiving a selected private or public network card (or a commercial carrier or otherwise), the slot being configured to receive cards for multiple networks;

(c) determining a type (e.g., product identifier) and/or origin (e.g., vendor code) of the selected network card; and (d) selecting, for the selected network card and based on the determined type and/or origin, a set of a connection manager and a connection monitor from among a number of sets of connection managers and monitors corresponding to different types and/or origins of network cards. The connection manager interacts with the corresponding network card in establishing a connection with the corresponding wireless network, and the connection monitor monitors a state of the connection. The connection manager and/or monitor of a first set is different from a respective connection manager and/or monitor of a second set.

In another embodiment, a data collection and transmission method is provided that includes the steps:

(a) collecting information regarding vehicle state and/or vehicle occupants;

(b) establishing a first connection with a first network to transmit collected information to a remote server via that network;

(c) thereafter determining a status and/or health of the first connection;

(d) when the first connection is down and/or unhealthy, requesting the removal of power to a selected wireless card positioned in a slot;

(e) when the request is denied, terminating execution of a communication initiation application; and (f) after terminating execution of the communication initiation application, again requesting the removal of power to the selected wireless card.

The present invention can provide a number of advantages depending on the particular configuration. For example, the invention can provide a powerful and flexible, hardened modem that, among other things, utilizes advances from the programming and computing component industries to create a modular modem that users can much more easily program and integrate into their networks, and which can be used interchangeably in fixed and mobile applications with a variety of data and communication alternatives.

A number of developments enable the advance in modem functionality, flexibility, modularity and capabilities, including:

(1) better and cheaper components which can be borrowed form other the computing and other industries (e.g., cheaper, faster and more efficient processors and mainboards, and off the shelf items such as RAM, high capacity CF and/or HDD disks, wireless connection cards and other advances in communications equipment and functionality);

(2) a need for new, easier and more flexible programming, including support for full operating systems, applications and common languages; and (3) a need for more connections and ports for much greater communication and data options and flexibility.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

The present invention can be more readily understood in conjunction with the accompanying drawings, in which.

DETAILED DESCRIPTION

System Overview

Figure 7:
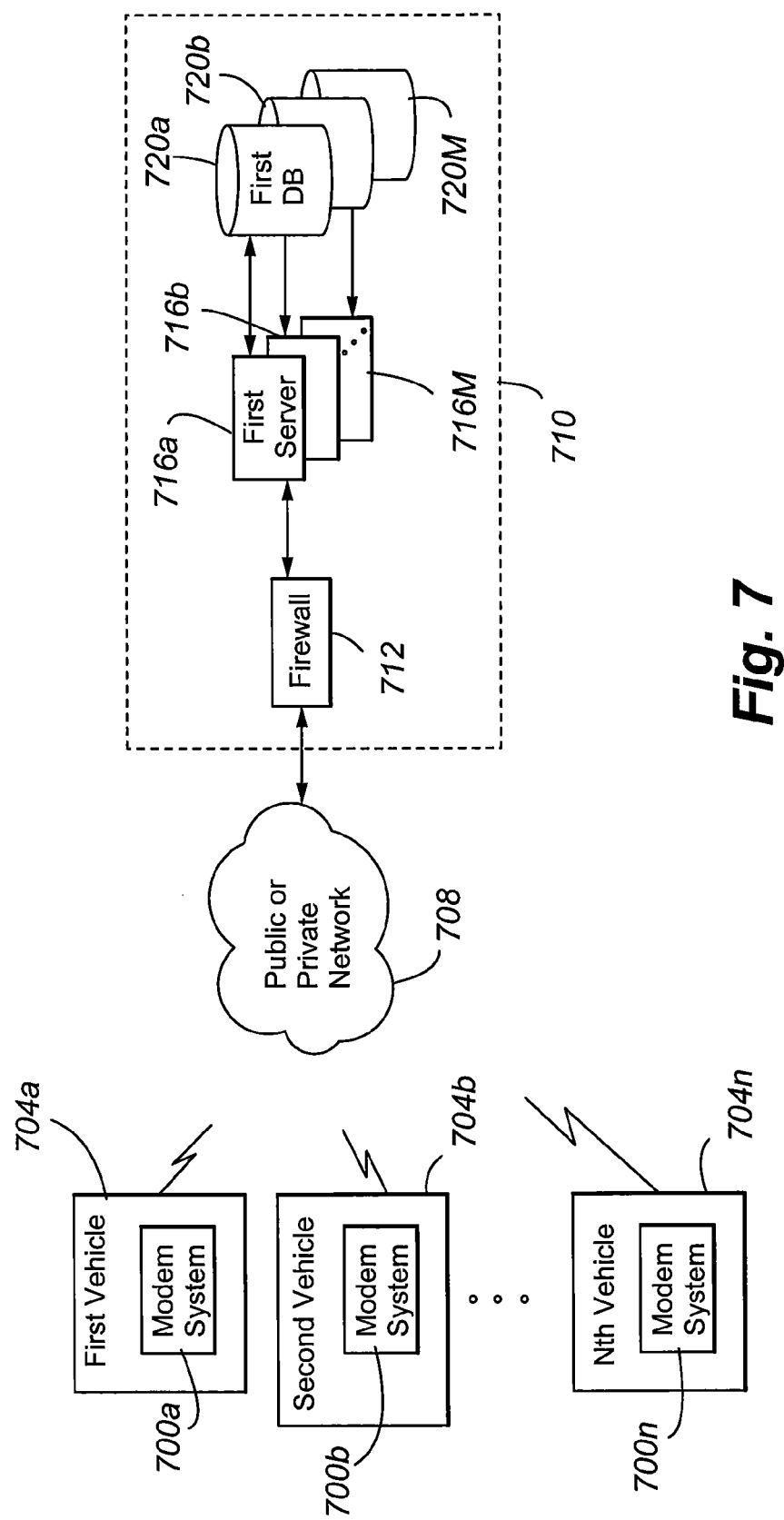
FIG. 7 is a block diagram depicting a network architecture according to an embodiment of the present invention.

In one embodiment, the smart modem system collects and transmits selected output information regarding a vehicle state and/or its occupant(s) and/or receives selected input information for use by the vehicle and/or its operator. "Vehicle state" refers to a condition, function, location, or operation of a vehicle or a component or accessory thereof. As shown in FIG. 7, first, second, . . . nth smart modem systems 700a-n are incorporated in a first, second, . . . nth vehicles 704a-n. Each of the smart modem systems is in communication with a wireless public or private network 708. The wireless network 708 is, in turn, in communication with an enterprise Local Area Network or LAN 710 that includes a firewall 712, first, second, . . . mth servers 716a-m and first, second, . . . mth databases 720a-m. The modem systems collect selected types of information and continually or periodically forward the information, via the network 708, to the enterprise network 710 for storage and processing. The stored and processed information can be accessed locally and directly by clients, such as PCs and laptops, internal to the enterprise network 710 or remotely by clients external to the enterprise network. The stored information is typically indexed by a unique SMD device name and corresponding vehicle name pairing. As will be appreciated, the multiple databases 720 a-m need not have a one-to-one correspondence with the servers 716 a-m, but may include more or fewer databases.

The vehicles can be motorized, such as commercial or private trucks and cars, or unmotorized, such as trailers (e.g., refrigerated trailers). Preferably, the vehicles have an onboard power source that is capable of powering the modem system and its peripheral devices, such as sensors. In one configuration, the vehicles are snowplows operated by a governmental entity (such as a municipality, city, county or state), concrete mixers, concrete pumpers, refrigerated trailers, semi trucks, busses, dump trucks, garbage trucks, delivery vehicles, maintenance vehicles, emergency vehicles, and the like.

The wireless network 708 can be any type of wireless service and/or air interface, such as Advanced Mobile Telephone Service or AMPS, Digital Advanced Mobile Telephone Service or D-AMPS, Digital Communication Service or DCS1800, Global System for Mobile Communications/General Packet Radio Service or GSM/GPSR, North American Digital Cellular, Personal Communications Services, Personal Digital Cellular, Total Access Communication System, High Speed Downlink Packet Access or HSDPA, Enhanced Data GSM Environment or EDGE, 1xRTT CDMA, CDMA2000, Evolution Data Optimized or EVDO, Digital Enhanced Network or iDEN, Specialized Mobile Radio or SMR, 802.11x, WiMAX or 802.16, and other public and private networks, with Frequency Division Multiple Access or FDMA, Time Division Multiple Access or TDMA, Code Division Multiple Access or CDMA, Cellular Digital Packet Data or CDPD, Wideband CDMA or WCDMA/UMTS, or others. The public or private network 708 can be either landline or wireless. Wireless networks can be operated by one or more private or public networks, including carriers, such as Sprint™, Nextel™, Verizon™, Cingular™, Alltel™, Western Wireless™, AT&T Wireless™, Unicell™, Westlink™ and others, as well as affiliates thereof. Bandwidth and/or transmission speeds, and/or the frequency and method of data transmissions, may be intentionally limited (by setting appropriate modem parameters) to qualify for favorable telemetry rates.

The information collected 1612 (FIG. 16) by the modem system 1600 (FIG. 16) can vary depending on the application. The information 1612 can include vehicle speed, vehicle acceleration, engine revolutions-per-minute, engine temperature, engine oil pressure, fuel level, battery amperage, battery voltage, odometer setting, tire pressure, mileage per gallon, other onboard warning systems and sensors, weather conditions (such as temperature, humidity, wind speed and direction, wind chill, raining, snowing, blowing snow, foggy, clear, overcast, etc.), road conditions (e.g., icy, slushy, snow-packed, frosty, wet, dry, etc.), physical location 1620 (FIG. 16) (e.g., Global Positioning System or GPS-based location), snow plow 1504 (FIG. 15) setting (e.g., snowplow position and orientation such as plow 1504 up or down and angle relative to the truck longitudinal axis), mixture and amount of material being applied by spreader 1508 to a selected surface (e.g., salt level, sand level, magnesium sulfate level, other chemicals or materials, and combinations thereof), revolutions-per-minute of concrete mixing vessels, pumping pressure of concrete, video images of the vehicle's exterior environment or the vehicles' interior or exterior, audio of the vehicle's interior, airborne chemicals or particulates, radiation levels, friction measures, thermal and/or infrared imaging, credit card receipts, passes, driver identifications, bar codes, receipts, remote databases, instructions, job tickets, and directions and other information which can be displayed, sensed and/or input, manually or on an automated basis.

The information is typically converted into a selected form, packetized, and transmitted over the wireless network. The form of the information can be in accordance with any selected language, such as the eXtensible Markup Language or XML, the HyperText Markup Language or HTML, Remote Method Invocation or RMI, or Direct Socket Connections. The packets can be transported using any suitable protocol, such as the Transport Control Protocol/Internet Protocol suite of protocols, Simple Object Access Protocol, or User Datagram Protocol.

The enterprise network 710 can perform a variety of data processing functions. The network 710, for example, can compare information or a given sensed parameter to identify temporal trends or differences and, if necessary, generate appropriate alarms. The alarms can be logged internally and/or forwarded to the respective vehicle via the modem system. The vehicle operator and/or automated components thereof can then take appropriate remedial action to address the cause of the alarm. It can prepare selected reports on the information. It can log events. The enterprise network 710 can also provide communications to the modem system 1600. The communications can, for example, provide instructions 1624 to the vehicle operator, such as vehicle and/or ancillary device operation and dispatch commands, and/or to automated components of the vehicle itself to remotely control selected vehicle operations.

Figure 14:
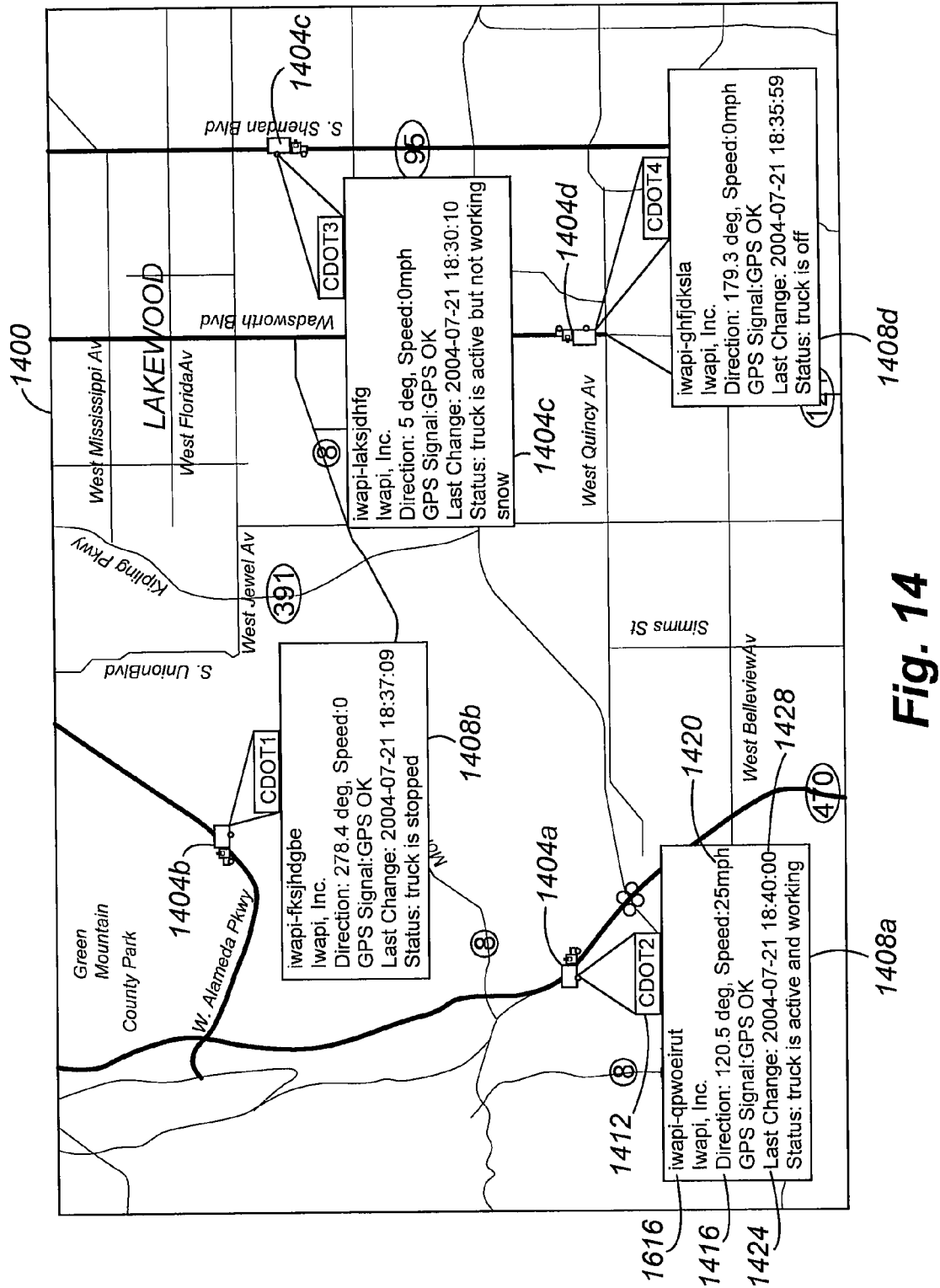
FIG. 14 depicts a map according to an embodiment of the present invention.

In one configuration, the data processing can provide a spatial map 1400 (FIG. 14) showing vehicle locations, vehicle operations, and other state information. For example and with reference to FIG. 14, the map 1400 can depict the location of each of a number of snowplow trucks 1500 (FIG. 15) using an icon 1404a-d denoting each truck. The icon 1404 color can be varied to indicate differing vehicle states. For example, the color green indicates that the truck 1500 is active and working (e.g., blade down and/or spreading deicing materials), yellow that the truck 1500 is active but not working snow (e.g., not blading or spreading materials), red that the truck 1500 is stopped, and gray that the truck 1500 is off or out of range for at least a selected period of time. Text information 1408a-d can be depicted on the map adjacent to or associated with each icon 1404. The text information 1408 can describe selected state information associated with the truck 1500, such as a truck identifier 1412, direction of travel 1416, speed 1420, status of GPS signal 1424, and timestamp 1428 of last data update for the identified truck. The map 1400 can also depict, for a selected vehicle, a trace route over a selected period of time. A trace route indicates the path of travel of the vehicle over the selected time period.

Figure 8:
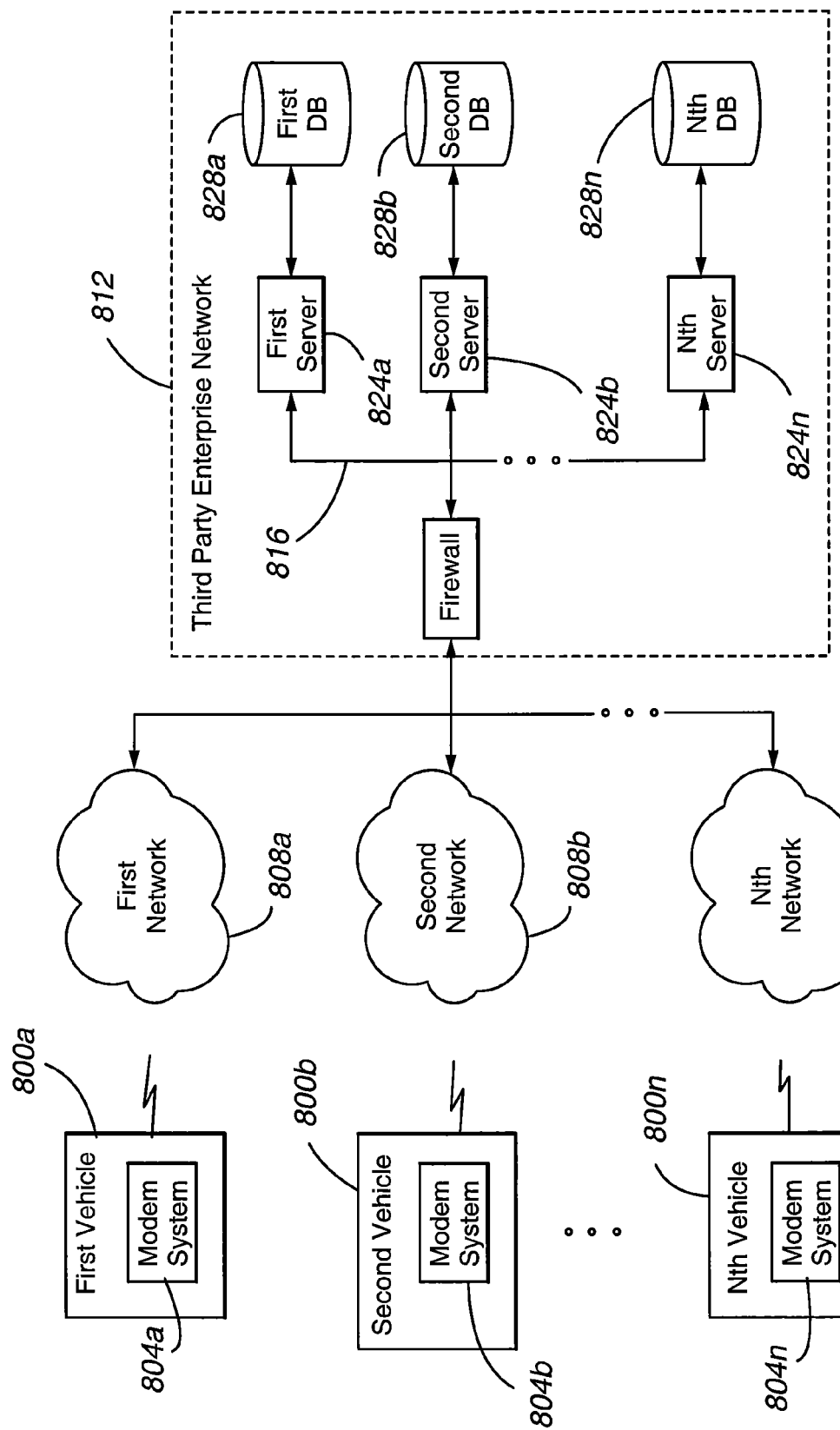
FIG. 8 is a block diagram depicting a network architecture according to an embodiment of the present invention.

FIG. 8 depicts an architecture according to another embodiment of the present invention. The architecture includes a first vehicle 800a including a first modem system 804a in communication with a first wireless network 808a, a second vehicle 800b including a second modem system 804b in communication with a second wireless network 808b, . . . and an nth vehicle 800n including an nth modem system 804n in communication with an nth wireless network 808n. Each network is typically operated separately by different entities or carriers. The vehicles are commonly operated by different business entities (e.g., are owned and operated by different companies). The first, second, . . . nth networks 808a-n are in turn in communication with a third party enterprise network 812, which provides contractual (fee-based) data storage and optionally processing services. The enterprise network 812 includes a LAN 816 interconnecting a firewall 820, a server farm or cluster of first, second, . . . nth servers 824a-n and one or a number of databases 828a-n. Each of the databases 828a-n is configured for a specific business entity operating one or more vehicles. In one configuration, the databases are replaced by a single database partitioned for each of the business entities. In any event, the information collected by the various modem systems is stored in the respective database or database partition. Data processing software customized for each entity can be resident in the enterprise network 812. Representatives of the independent entities can access, from a remote client, the data for which it has authorization, such as a PC or laptop.

In the above embodiments, the modem systems commonly include a smart modem device and peripherals thereof, such as a video monitor (e.g., a touchscreen), external GPS and connection antenna, and wired or wireless connections to internal vehicular components.

Smart Modem Device

In contrast to prior art in the field, the present invention can provide a powerful and flexible, hardened modem that, among other things, utilizes advances from the programming and computing component industries to create a modular modem that its users can much more easily program and integrate into new or existing networks, and which can be used interchangeably in fixed and mobile applications with a variety of data and communication alternatives.

This smart modem device (sometimes referred to "smart modem" or "smart device"—or "SMD" for short) can be built around ultra-compact and highly integrated mainboards and modem components originally developed in the computing, programming and other industries, including embedded high performance, low heat, ultra low power processors, replaceable RAM and Compact Flash (CF) memory, and various internal and external ports that can be used for communications and the transmission and/or receipt of information. Various modular options can also be added and incorporated at manufacture or in aftermarket, including additional memory, enhanced video cards, additional connections and inputs, additional memory, etc.

The SMD can incorporate full programming language support and be fully user programmable in various common languages such as Perl, Java, C variants, .NET and others. This programming flexibility can be used both for purposes of setting up and directing the transfer or receipt of data and information, as well as for the processing thereof, if and to the extent such field processing and/or translations are required in the field. In addition to interfacing in traditional standards such as ASCII, HEX and other formats, the SMD is fully SOAP XML Web Services compatible. In addition to the communications elements of the modem, users can run Linux, Microsoft and other programs to provide additional desired utility and functionality, such as for taking MPEG 4 or other video from the field, running applications and peripheral services in the mobile or field environment, without the need for separate equipment such as laptops, computers or processors. The SMD can provide flexible modem functionality on a stand-alone basis. The SMD can be remotely access, upgraded and/or reconfigured if and as so necessary.

The SMD can anticipate and provide for interchangeable and upgradeable communications and data options through PCMCIA, CF, RJ45, RS-232, USB and other connections. Wireless services, for example, can be used on one network in one part of a state, and on another network in another part of the state, with the simple interchange of a connection card in the PCMCIA (cardbus) in the back of the device, and a corresponding change in drivers for the new network and card. Other devices can be as easily changed to operate on network connections, fiber connections, wireless Ethernet connections and other alternatives. Such conversions, as well as simply the replacement of a damaged card or component, can be done at the nominal cost of that given card or component, rather than the replacement of the entire device.

The SMD can provide a powerful and flexible, hardened modem that, among other things, utilizes advances from the programming and computing component industries to create a modular modem that users can much more easily program and integrate into new networks, and which can be used interchangeably in fixed and mobile applications with a variety of data and communication alternatives. The flexibility, power and integrated modularity marry hardware and programming to provide a truly synergistic advance in the state of the art in modem technology, and associated applications of telemetry, data collection and communications. Without repeating what has already been said above (and incorporated herein), the device is below presented in its various component pieces. The modem preferably has a modular design, including both the hardware and software, as well as the interchangeable external components, including without limitation the various COM and data options with which it works (e.g., connection cards, land lines, GPS units, cameras and the various vehicles and field devices to which it is attached). Significantly, if any given component is damaged or destroyed, or otherwise made obsolete by advances in science and technology, such components can generally be replaced and upgraded for nominal cost and the device redeployed. The entire unit does not have to be replaced, and maintenance and repairs for individual units (or planned groups of units) replace broad and expensive capital replacement programs as communication carriers migrate to ever new and improved communications options and services, or clients migrate to private or other public networks. Commercial connection cards for example can be swapped out, one for another, and often at no net upfront cost (after activation credit), by simply popping out the old PCMCIA card and popping in the new with the new connection driver. Mainboards can be replaced in nominal time and at low cost. Memory can be expanded for many GBs of additional storage at low cost. The device can be completely reprovisioned for use with new cameras or other equipment by simply downloading new files (remotely or on-site) or swapping out the internal CF for a new disk. Historic problems of replacing entire devices and incurring thousands (sometimes millions) of dollars of capital upgrade costs has been broken down and replaced with a more practical use and marriage of more sophisticated and flexible components from the fields of hardware, software and general design.

The following provides a more detailed discussion of the various components advantages, features and objects of the SMD.

Case size is currently primarily a size of the existing components and a trade-off in costs. Bigger becomes impractical. Smaller currently gets disproportionately expensive. With current component sizes and price points, we typically use cases such as the 2.5"×8"×10" Morex #3688 steel case 1 featured in the accompanying photos. It is anticipated that smaller cases will be usable as ever smaller components become more price competitive. While smaller cases can be used, a larger case can provide a bit extra room to work with, dissipate heat, add additional internal components when and as desired (e.g. additional internal memory 25 & 29), and yet is small enough to be collocated with other equipment in even larger or more protective cases such as NEMA 4 and other environmentally protective cases such as the roadside box shown in FIG. 6. Internally, the tray is modified to mount the internal CF 27a, 27b and 27c, the DC voltage regulator and sequencer for automotive applications 25 (if not otherwise incorporated directly into the power supply 42), and other items.

All Figures show the 2.5"×8"×10" Morex case configuration, though other cases can also be used. Any suitable case that can accommodate the following components can be used.

Figure 3:
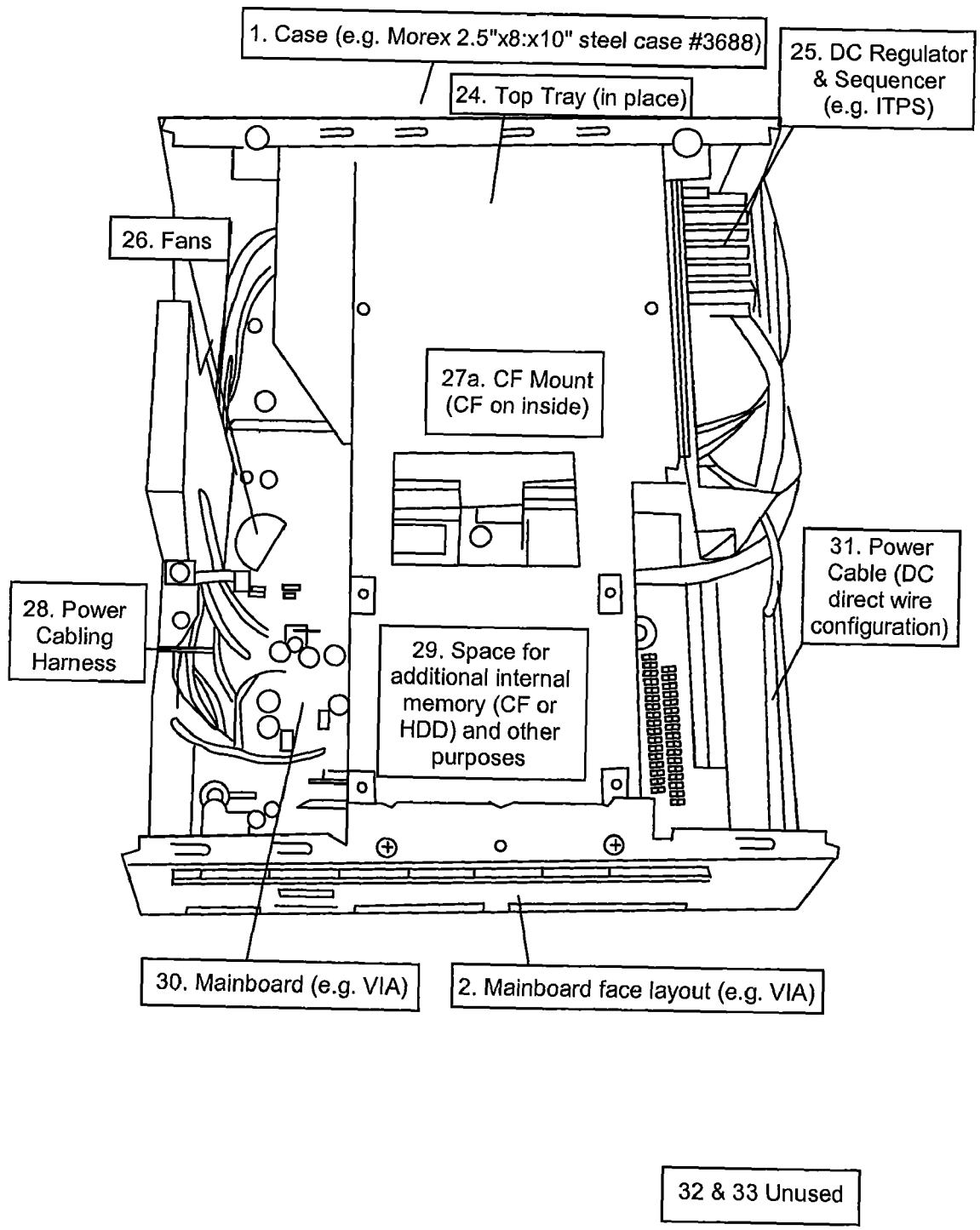
FIG. 3 shows the interior of the SMD with the cover removed (including DC module with voltage regulator and sequencer for automotive applications) according to an embodiment of the present invention.
Figure 4:
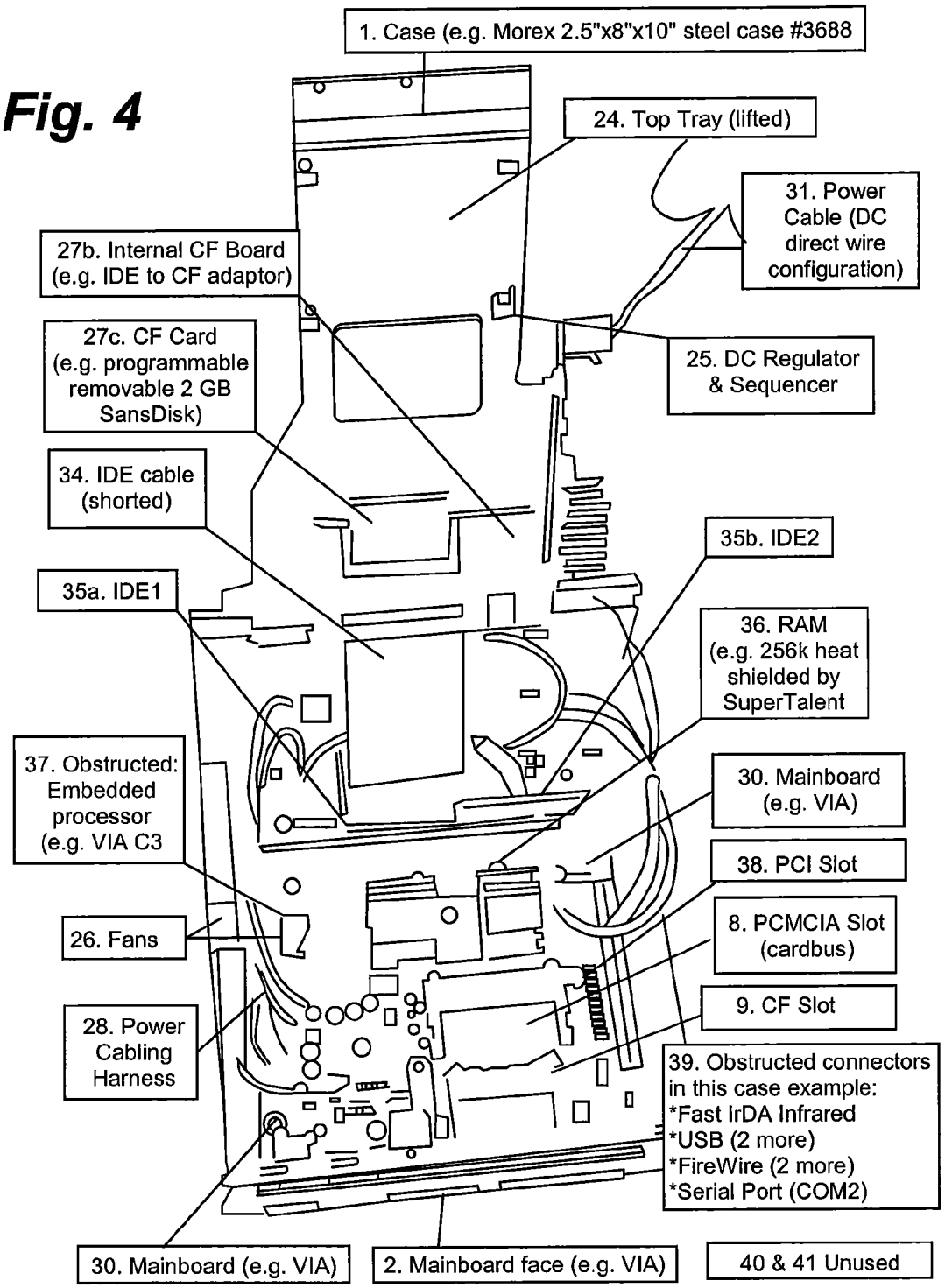
FIG. 4 shows the interior of the SMD with the cover and top plate removed (including DC module with voltage regulator and sequencer for automotive applications) according to an embodiment of the present invention.
Figure 5:
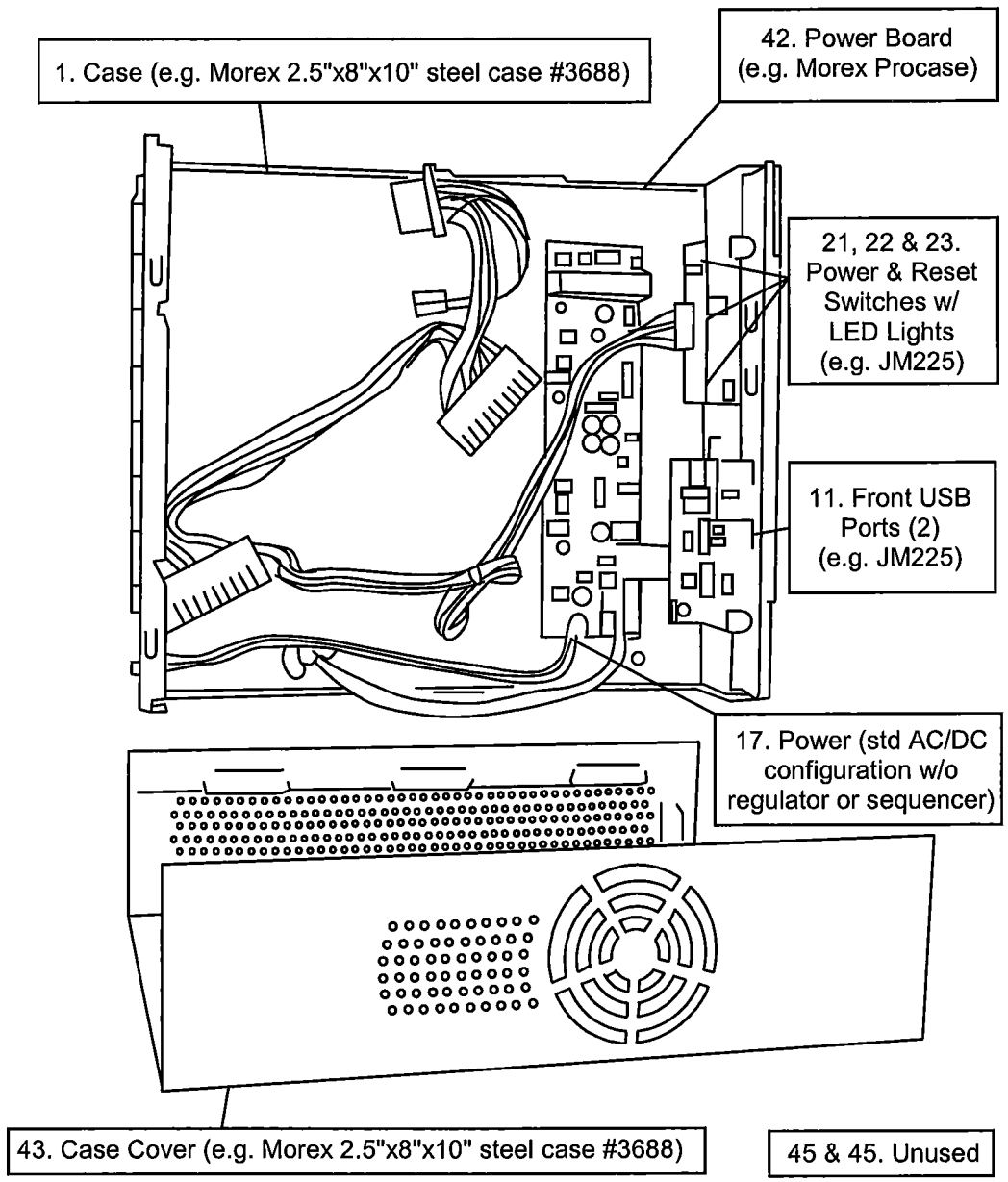
FIG. 5 shows the interior of the SMD with the cover, top plate and mainboard removed (in standard AC power configuration as in FIG. 1 above) according to an embodiment of the present invention.

FIGS. 3 and 4 show the embedded system in the case with integrated VIA mainboard and 1 GHz processor, 2 GB compact flash for programming and data storage, 256 MB of heat shielded RAM, and an ITPS DC module with voltage regulator and sequencer as used for automotive applications. Other mainboards and components could be substituted.

The SMD is designed for both fixed and mobile applications. AC/DC power is typically incorporated. Such power supplies are generally sourced from the applicable case manufacturer, as the Morex Procase power board shown in the accompanying photos 42, but any reliable power supply will do. A voltage regulator should be used with the power board for mobile applications. A combination regulator and sequencer is either incorporated into the power board 42 or separately collocated such as the ITSP regulator and sequencer from Mini-Box 25 is typically incorporated to provide key on/off functionality with delayed power-off for an orderly initiation of the shut-down of the device and whatever functionality is then active.

Figure 1:
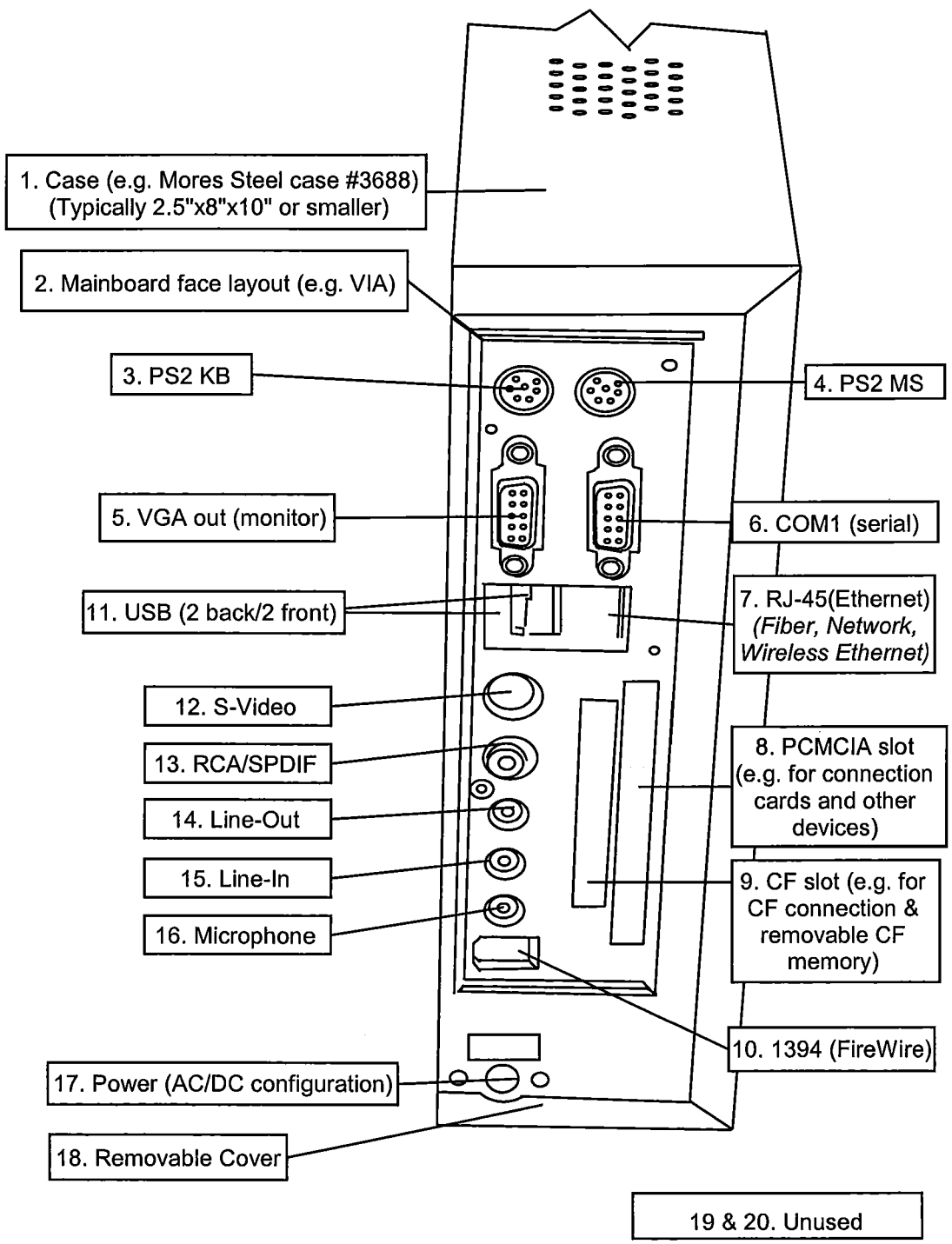
FIG. 1 is the exterior of the Smart Modem Device or SMD case showing the primary rear connection ports (in standard AC power connection) according to an embodiment of the present invention.
Figure 2:
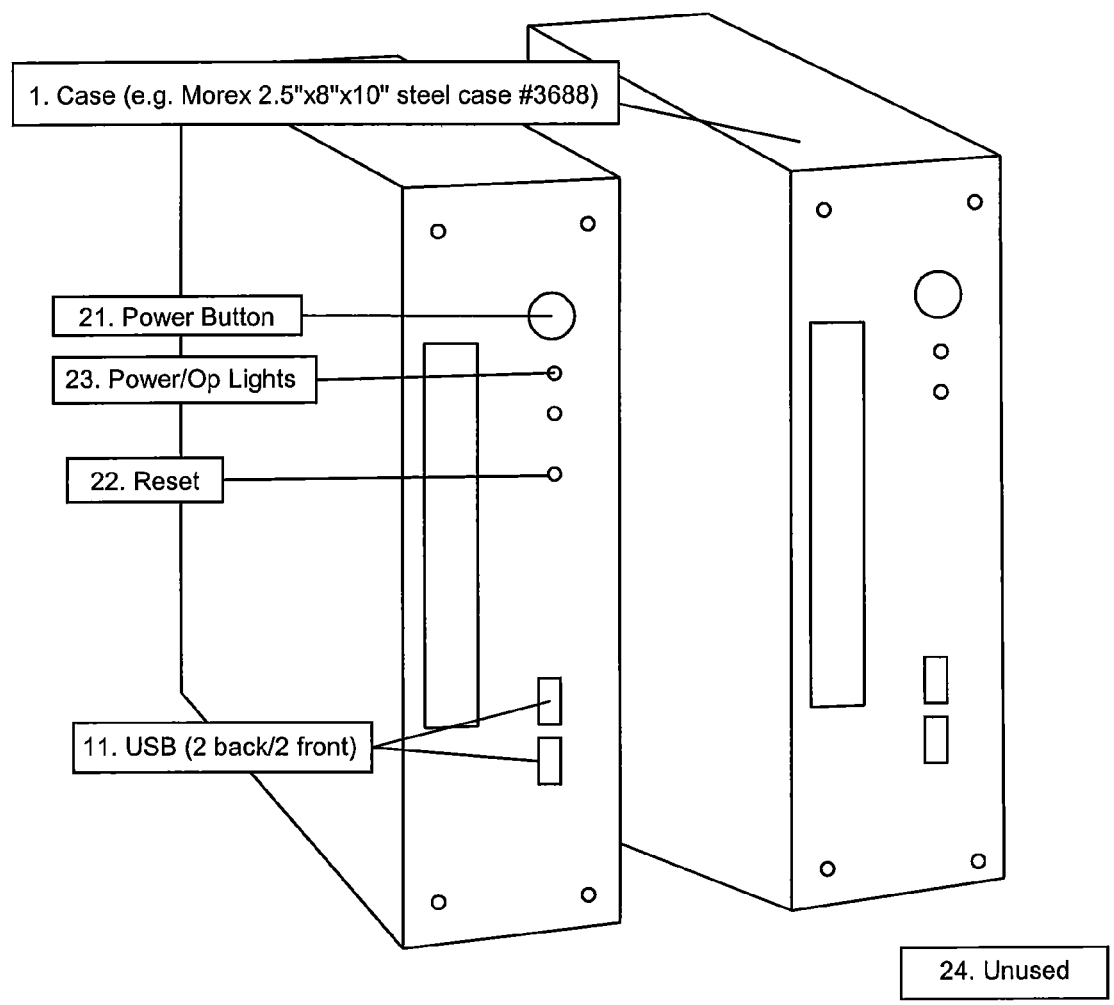
FIG. 2 is the exterior of the case of FIG. 1 showing the front face and additional ports there located.
Figure 6:
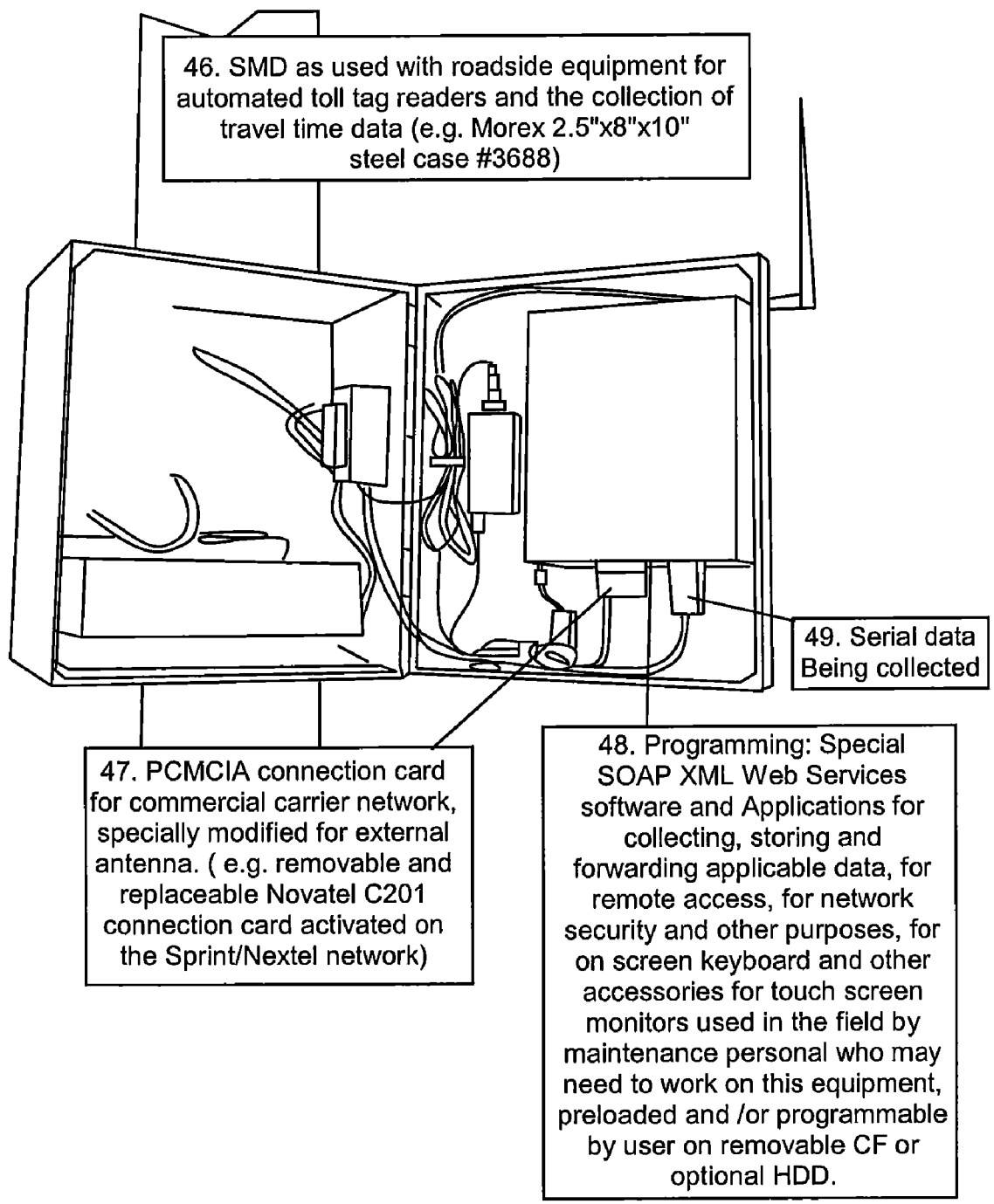
FIG. 6 shows SMD as used in roadside application (using AC power and PCMCIA connection card specially modified for an external antenna) according to an embodiment of the present invention.

Any small form factor mainboard with appropriate connections can be used, such as the VIA MII mainboard shown in the accompanying FIGS. 1, 3 and 4, and items 2-10, 30, 35, and 38-39. For data, video and other inputs, connections should be provided for major connection types intended to be used, including currently and without limitation, multiple USB, 1394, RCA and Serial connection options 6, 10, 11, 13 and 39. For communications, connections or slots should be available for, among other things Ethernet, PCMCIA (cardbus) & CF 7, 8, 9 and 39. Multiple IDE slots 35a and 35b, at least one PCI slot 38, and at least one DIMM slot for standard RAM 36 should be included. Typically the mainboards would carry an embedded ultra low power, ultra low heat processor such as a 600 MHz or the 1 GHz VIA C3 37 and support standard RAM 36 of typically 256 MB or more (the VIA mainboard 30 supports up to 1 GB of RAM). It is important that the embedded system use a processor that is low power low heat, or heat buildup can become an issue in the tight enclosures involved in various applications such as shown in FIG. 6. Advance in the computer component industry in these regards, and processors in particular (with significant advances in processing speeds with such ultra low power, ultra low heat processors as the C3 37) have made this advance in modem technology possible. Future mainboards can be even smaller, carry more or different ports and connections and even faster more efficient processing capabilities. In any event, the mainboard and associated faceplate (2 and 30) are inserted in and affixed to the applicable case. These "new" mainboards are substantially faster, and more modular and flexible, than mainboards found in traditional modems.

Any standard RAM 36 can be used. Typically, 256 MB or more of RAM is incorporated. In the accompanying FIG. 4, we are shown using 256 MB of heat shielded RAM from SuperTalent. The VIA mainboard 30, shown in the examples can support up to 1 GB of RAM. Additional RAM may be supported and used in the future. Such RAM can be used in either typical fashion (as most users use their PC—e.g. where operating files are primarily carried on separate memory such as an HDD drive or in this case CF 27c, and there is an ongoing interaction between the two) or in more specialized ways such as with special optical files or read only memory (ROM) where all operation code (operating files as well as application) are loaded into RAM on boot from the separate storage. In the later case for example, all operable code is bundled into one optical file or ROM, either of which can be loaded into and run from RAM once the device is powered up. Any malicious or accidental attempts to change or damage the operating code have but a temporary impact as the optical file will again and automatically reloaded in original form when the RAM next reads the file, such as on reboot or restart. In such cases, the RAM has to be larger than the combined files (ie. all programming and operating files). A fairly sophisticated application can run in this manner on less than 1 GB of RAM.

CF memory is typically used to get away from moving parts such as in HDD drives, and to provide a more hardened unit. Any CF can be used—the enclosed pictures show a 2 Gb CF card by SanDisk. While avoiding the moving parts of an HDD, the CF provides many of the benefit of solid state circuitry but with substantially more flexibility in terms of programmability and ease of use. An IDE to CF adaptor board 27b and shortened IDE cable 34 is used to integrate the CF memory with the mainboard 30 and associated functionality. Where, as with the VIA mainboard 30, an additional IDE slot is available, additional internal CF or HDD storage capacity can be added. Removable external CF memory can also be used in the CF slot provided and accessible from the faceplate 9. If the user prefers, an HDD (typically 20 GB or higher) can be used in lieu of or addition to the internal CF. The SMD can also boot from other memory, including USB sticks, if desired or needed.

The importance of having various COM and data options cannot be overstated, and the SMD specifically provides as much flexibility as technology and available components allow in this regard. The SMD anticipates and provides for interchangeable and upgradeable communications and data options through PCMCIA, CF, RJ-45, RS-232, USB and other connections, e.g 6, 7, 8, 9, 10 and 11. Wireless services, for example, can be used on one network in one part of a state, and on another network in another part of the state, with the simple interchange of a connection card in the PCMCIA (cardbus) 8 in the back of the device, and a corresponding change in drivers for the new network and card. Other SMD's can be as easily changed to operate on network connections, fiber connections, wireless Ethernet connections 7 and other alternatives including dial-up land lines via a PCMCIA card 8. Such conversions, as well as simply the replacement of a damaged card or component, can be done at the nominal cost of that given card or component, rather than the replacement of an entire device, as has been necessary with traditional external modems which operate on only one network and incorporate limited if any processing capabilities.

In the context of PCMCIA and CF connection cards 8 (which themselves are sometimes referred to as NIC cards, modems or aircards), the SMD provides a host environment much like, but much more flexible and powerful than, the external modems which themselves incorporate modules comparable to that in the PCMCIA or CF connection cards but which have but limited processing power and are far less flexible in terms of overall programming, processing or network changes. Such external modems, once so manufactured, are typically only usable on the network for which they were designed. If for example, a user changes carriers, the external modem is of no use or value. If the carrier changes technology (such as CDPD to GPRS), the external modem is of no use or value. Conversely, the SMD allows for the easy and quick upgrade of technology by the change of the PCMCIA card, and/or the quick change to an entirely different network or even to a fixed connection such as fiber, network, or wireless Ethernet where practical and available.

Programmability provides a new, significantly higher level of modem flexibility and performance. Typical modems offer little if any processing power and can only be used with a given technology, network or connection. The processing power, if any, is typically limited and of little practical use in many applications today. Such modems do not support full operating systems, and offer the user limited if any programming flexibility. Changes as simple as network password changes have required the modems to be uninstalled and sent to the manufacture for reprovisioning. Limitations with existing systems become especially acute and cost prohibitive in telemetric and other applications where the modem must operate without manual intervention and/or in series with other equipment which has no or limited processing power (i.e. other "dumb" devices). For whatever the reason, not the least of which is pricing pressures, much of the equipment used for example in industry, security, telemetric, and intelligent transportation systems, carry little onboard processing power and/or require a separate laptop or other computer to operate, download and/or forward the applicable information. The addition of such laptops and other external computers is generally either impractical (such as in unmanned and roadside applications) or cost prohibitive (generally doubling or more the cost of the modem itself). Furthermore, any given user may need connectivity for equipment located in different network service areas and/or with different types of connections (e.g. different wireless carriers, network connections, fiber connections, etc) and multiple types of data sources and inputs (multiple serial and USB inputs, as well as potentially video, sound, etc.). For national and international applications, and even applications on statewide and local levels, flexibility in communication and data collection options is important, as is the ability the user to program the modem, add network security, store and forward data, and to transfer the information in XML format via SOAP XML Web Services and/or such other format as their systems require.

The SMD incorporates full operating system and programming language support, by virtue of and with appropriate utilization of the above components. The SMD is fully user programmable in various common languages such as Perl, Java, C variants, .NET and others. This programming flexibility can be used both for purposes of setting up and directing the transfer or receipt of data and information, as well as for the processing thereof, remote access to download or upgrade programming or reach remote sites and equipment, receive and post messages to remote users, enable remote users to interface with the office, the internet or other systems.

The ability of the SMD to receive and process dynamic instructions is beneficial but often missing or severely limited in traditional modems which enable this type of remote access, and cannot even carry full operating systems or common modem applications, let alone take, for example, a remote upgrade of touch screen menus used to collect mobile information or to communicate with a lot of the disparate equipment in use today and newer equipment ever being developed.

The SMD's expanded programmability and more powerful mainboard and components enable the modem to take, process, store and/or forward information as not otherwise possible. Traditional modems typically have been set up to simply establish a connection to forward or allow the polling of given data. Traditional modems were not designed to run today's operating systems or applications, or to really do more than rudimentary tasks. The traditional modem cannot provide the host environment necessary to support the varied drivers and software necessary to support for example the many peripheral devices being integrated today, including without limitation USB cameras, touch screen monitors, weather station components, travel time sensors, mobile sensors and data feeds, etc.

With the SMD, this is possible and more. Operating systems, applications, special or new drivers, etc. all can be loaded, programmed and reprogrammed, and even be remotely accessed and changed if necessary. Peripherals can be added which require associated software to run and operate—software that could not otherwise be loaded on traditional modems by the end user, if at all. Off-the-shelf software, custom applications, legacy interfaces, new interfaces, special security overlays, etc. could not be readily loaded on traditional modems by the end user, if at all. With SMD's, users can load Linux, Microsoft and other systems, programs, drivers, etc. . . . to provide additional desired utility and functionality, or to support the peripheral equipment to which the smart modem device is attached. Applications requiring field processing, special drivers and/or software, such as for MPEG 4 video, barcode scanners, RFID sensors, work order forms, ERP systems, etc., can be integrated with the smart modem device without the need for separate laptops, computers or processors.

The programmability of the SMD contributes to the flexibility and modularity of the device, and in extending those benefits to the peripheral equipment with which the SMD is connected (eg. camera, gps, weather equipment, monitors, etc. . . . even the communication card or carrier itself). When a given component or peripheral fails or is otherwise replaced, a new component or peripheral (even an entirely different peripheral) can be attached and new drivers and associated software can be easily loaded. If there is a change in communications carriers, or if a given communication carrier phases out one technology and migrates to another (as with the migration by the former ATT Wireless from CDPD to GPRS), only the connection card and drivers need be replaced, not the entire smart modem device.

The above also enables the SMD to be fully SOAP XML Web Services compatible, unlike traditional modems. XML interfaces are becoming increasingly important in networking disparate equipment and systems, reducing network overhead, etc. In addition to interfacing with traditional formats such as ASCII, HEX and others, the SMD can provide full XML interfaces. The SMD, for example, can be easily loaded with JAVA and an associated application to receive data and forward it in XML in a SOAP XML Web Services compatible format. This capability and the ability to adapt and integrate with other and new services and formats will become especially important for deployments over time.

New and ever changing security requirements, changes in network connections and systems, authentication schemes (internal and carrier related), further punctuate the need for the enhanced programmability and capabilities of the SMD. As they evolve, such changes and overlays can be integrated and loaded, and later changed and updated as necessary, with relative ease. The SMD is programmable and reprogrammable. CF cards can be changed in the field to completely reprogram the device. Other security changes can be made by USB stick or remote access. In short, the SMD provides flexibility to grow and adjust with future needs and developments.

Figure 9:
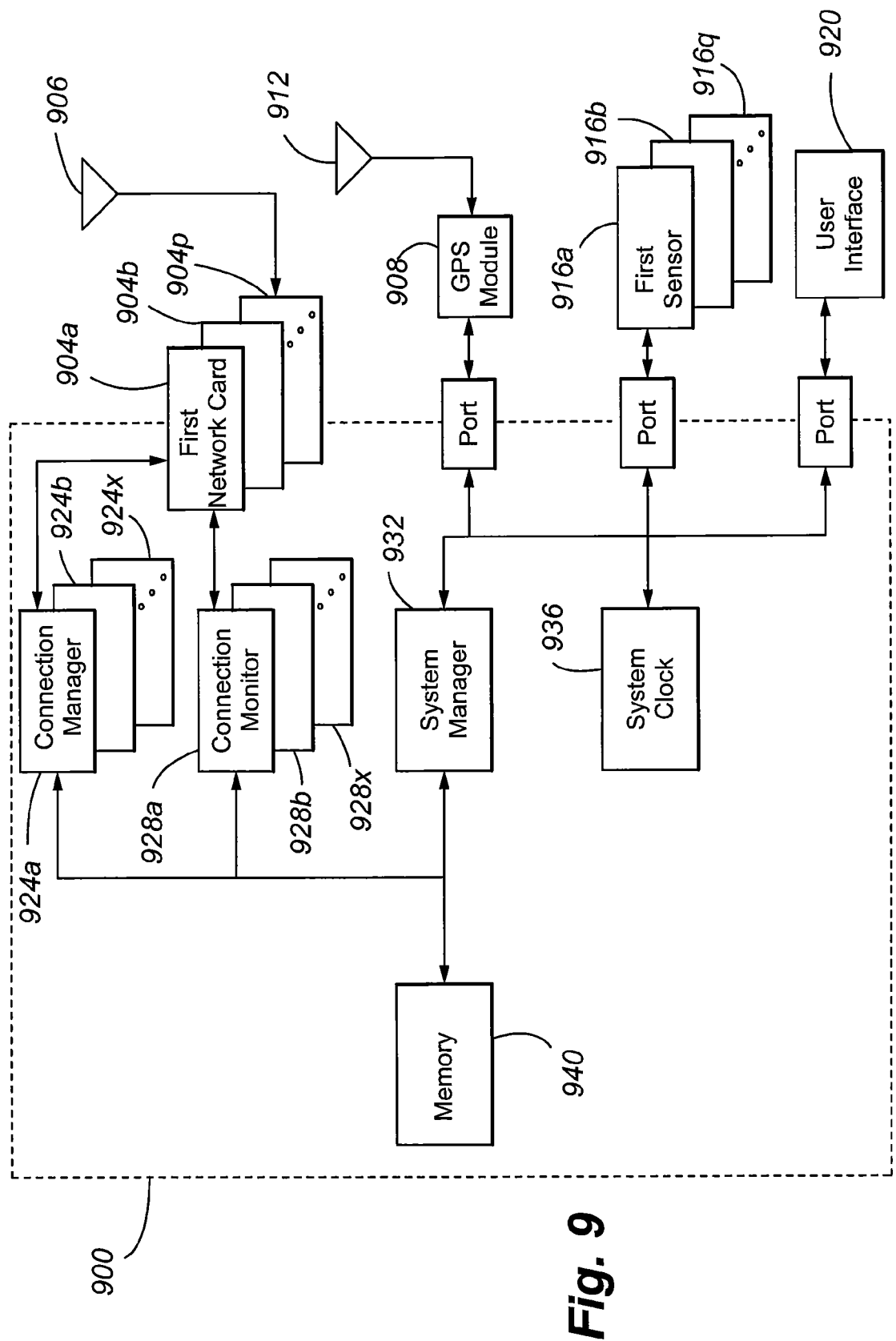
FIG. 9 is a block diagram depicting a network architecture according to an embodiment of the present invention.
Figure 15:
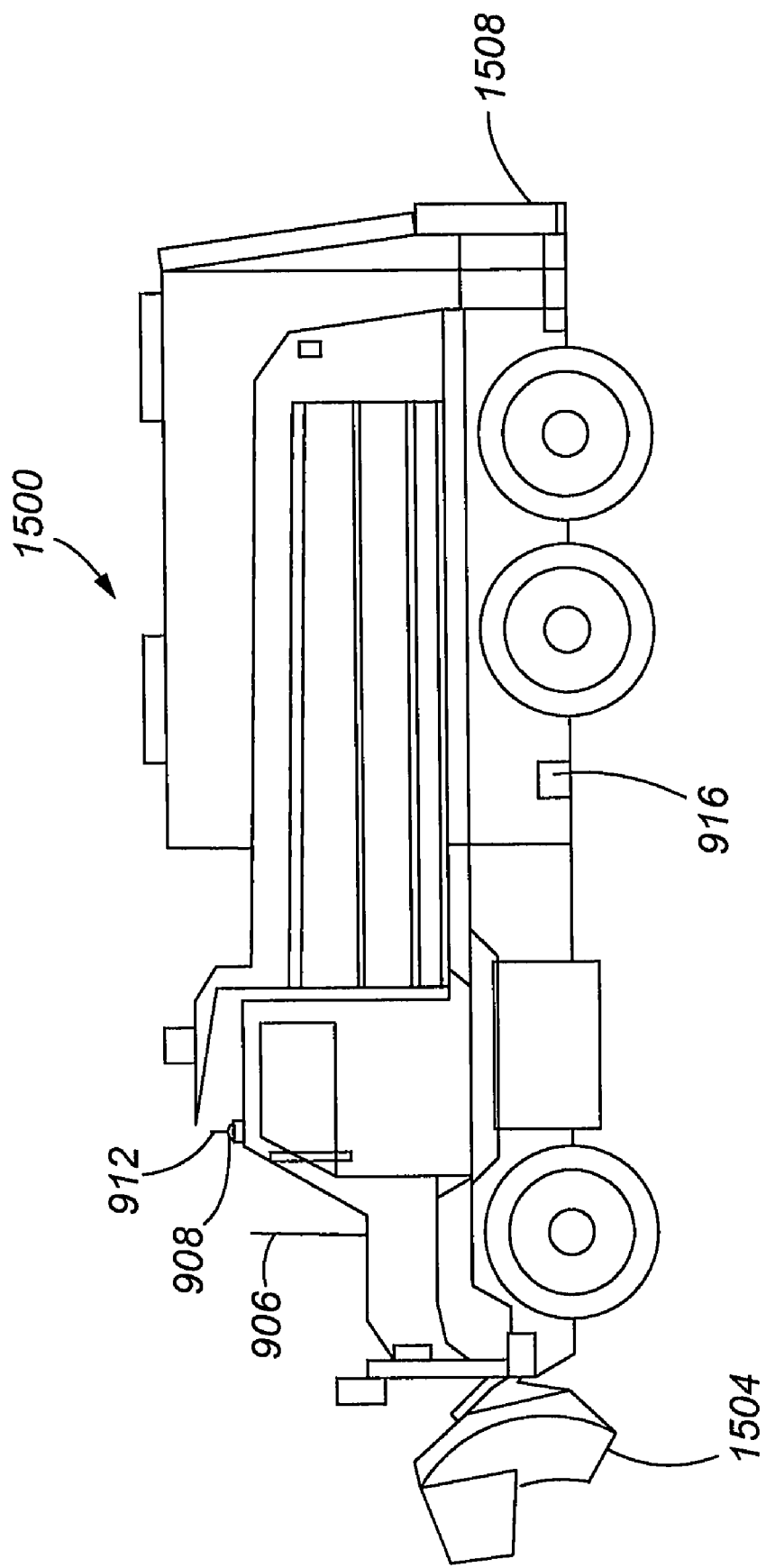
FIG. 15 depicts a snowplow according to an embodiment of the present invention.
Figure 16:
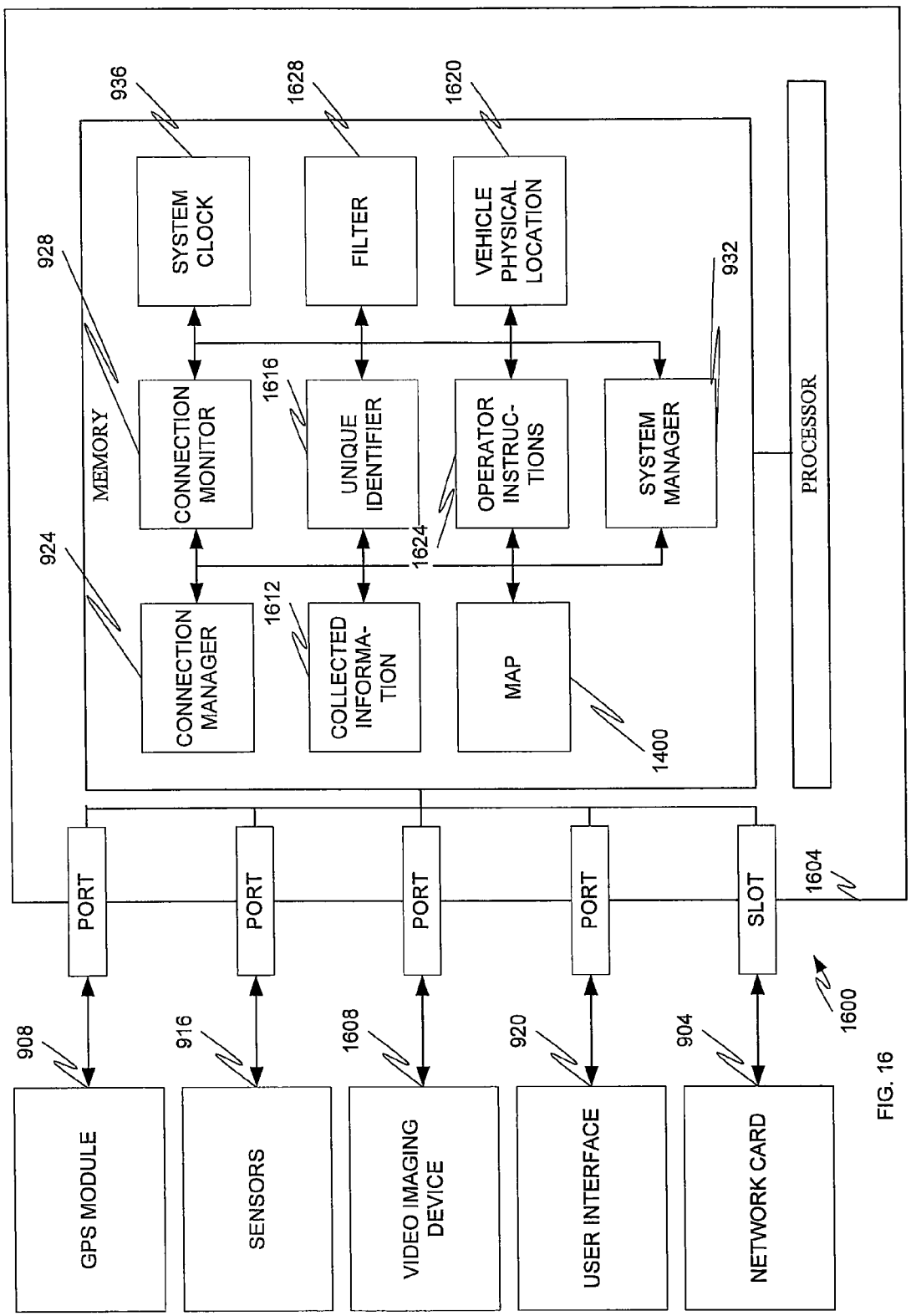
FIG. 16 depicts a block diagram of the components of a data collection system according to an embodiment of the present invention.

FIG. 9 depicts a signal flow diagram, FIG. 15 a snowplow, and FIG. 16 a modem-based system according to an embodiment of the present invention. The modem-based system 1600 comprises one or more network cards 904*a-p*, each plugged into a corresponding slot (not shown) of the modem or SMD 900, an antenna 906 for duplexed communications with a network, a GPS module 908 and corresponding antenna 912, a plurality of sensors 916*a-q*, a user interface 920, and the SMD 900.

The network cards 904*a-p* are provided by a wireless carrier or network administrator, and contain the logic and related parameters required for access to the corresponding network. Although multiple network cards are depicted, it is to be understood that the present invention includes an SMD configuration having only one slot, as shown in the SMD configuration discussed above. Each of the network cards is interchangeably received in each slot. Thus, cards from different networks or different types of cards from the same network can be placed in any of the slots. As will be appreciated, each card normally has an associated unique identifier (for example a ten digit number assigned to the card by the carrier). The card is typically activated by contacting the service provider or network administrator, or by doing an automated activation via an applicable web page.

The GPS module 908 can be any suitable GPS module, including the GPS module discussed previously. Typically, the GPS module forwards digital location signals (e.g., GPRMC NMEA sentences) to the SMD 900. The timing of the signals is typically controlled by the GPS module. A preferred GPS module 908 integrates the antenna 906 and GPS module 908 into a GPS puck positioned on the exterior of the vehicle. The GPS module can be plugged into various available ports on the SMD, including specially created ports such as a special five-pin DIN connection. The GPS module can also be separated from the antenna and collocated inside of the SMD.

The sensors 916 can be of a variety of types and monitor different parameters. The sensors, for example, can include temperature sensors (e.g., for ambient and engine temperatures), pressure gauges (e.g., for oil, fuel pressure, and/or cement pumping pressure), sensors for measuring the revolutions per minute of a motor, engine, or rotating member, speedometers, odometers, compass, and various other wired or wireless sensors and inputs from equipment on or near the vehicle. In one configuration, the sensors include a still and/or motion video imaging device 1608 to provide still or full motion images to the remote server. In one configuration, the sensors 916 include a microphone to provide audio to the remote server. Analog-to-digital conversion is employed, as needed, to convert analog signals from sensors 916 to digital format.

The user interface 920 can include a variety of devices, such as a keyboard and/or monitor. The monitor is preferably a touchscreen. The monitor can provide the operator with various options to control operations of the vehicle (e.g., pumping speed, plow blade, bucket, or truck bed, mixture of materials to be applied to a surface, rpms of concrete mixer, and the like), provide data input regarding the vehicle state (e.g., snowplow is raised or lowered) or environmental conditions, transmit text messages to the remote server, receive text messages from the remote server, and views of the data transmitted and/or received.

The SMD 900 includes a number of internal logic modules for performing various operations. The connection managers 924*a-x* configure the SMD 900 as required by the particular network card 904 in the slot or otherwise selected by the user and interacts with the card to establish a communication session with the remote server. The connection monitors 928*a-x* monitor the health and/or state of the connection and, if the health is unacceptable (e.g., the connection has too much interference or the Quality of Service is unacceptable) or the link used by the connection is down, reestablishes the communication session by setting up another connection. Typically, a set formed by one connection manager and monitor corresponds to each type and/or origin of network card 904 used interchangeably in the slot(s). The system clock 936 is synchronized to a universal time clock and provides internal timing information to control SMD operations and timestamp collected data. The memory 940 is used during normal processing operations and as a buffer for data 1612 collected when the connection with the network is either unhealthy or down. Finally, the system manager 932 oversees operations of the SMD, identifies the types of digital incoming signals (e.g., by sensor 916 type) and, based on the type of incoming signal, translates the digital signals received from the sensors 916 to a selected language or format, packetizes the collected data 1612 with a data-type identifier included in the payload, and applies headers to the packets for uploading onto the network, handles mail and messaging functions, includes drivers and programming for the user interface, performs remote system maintenance and troubleshooting functions, and other functions.

In one configuration, the manager 932 process multimedia information. For example, the manager 932 uses the following parameters to process video information: the URI address of the remote server, the imaging device name, time interval between snapshots, Boolean value for whether images should have a current date/time stamp, Boolean value for whether attachments should be sent as DIME or MIME attachments, temporary file storage location, and the name 1616 of the SMD 900 sending the video information. The name 1616 of the SMD 900 is used by the remote data processing network 710 to associate the received information with the corresponding vehicle; thus, the sending device name 1616 is selected to identify uniquely the SMD.

Operation of the Connection Manager and Monitor

The operation of the connection manager and monitor will now be described with reference to FIGS. 10-12.

Figures 10, 13:
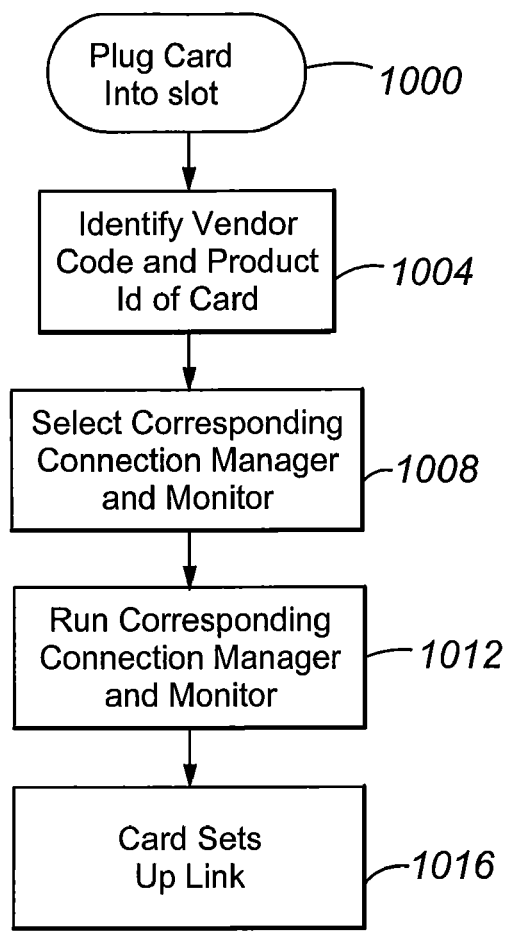
FIG. 10 is a block diagram of the components of a modem system according to an embodiment of the present invention.
FIG. 13 is a set of data structures according to an embodiment of the present invention.

FIG. 10 depicts the process used to establish a link or connection with a network using a selected network card 904. The process starts in step 1000 when the user inserts a network card into a slot.

In step 1004, the manager 932 identifies the card vendor code and product identifier. This is obtained by querying the card and/or by manual input such as via the touchscreen monitor.

In step 1008, the manager 932 selects the corresponding connection manager 924*a-x* and monitor 928*a-x* for the particular card type and vendor. This can be done by dynamically writing the appropriate connection manager 924*a-x* and monitor 928*a-x*, or by commenting out the unselected sets of connection manager 924*a-x* and monitor 928*a-x*, or by placing a character or symbol indicating nonexecutable comment text in front of the code associated with the unselected connection managers 924*a-x* and monitors 928*a-x*. The selected set of connection manager 924*a-x* and monitor 928*a-x* is not commented out.

In one configuration using a Linux operation system in the SMD, the connection manager 924*a-x* and connection monitor 928*a-x* are, collectively, formed by a number of daisy-chained files. In this configuration, the connection monitor 928*a-x* refers to the initialization file while the connection manager 924*a-x* refers to the chat script file, peers file, pap-secrets file, and ip-up.local file.

The initial file in the chain is the connection monitor 924*a-x* and is a file containing initialization information and script to perform various operations, including the next file in the file sequence. The file, for example, contains the logic of FIG. 11.

The next file in the chain is the peers file, which controls and configures (e.g., provides setup parameters for) a communications initiation application (not shown) of the operating system. The communication initiation application is preferably a part of the connection manager. The communications initiation application effects, after the link with the network is established, communication with other nodes via the network. As will be appreciated, in the Linux operating system the communications initiation application is known as the Point-to-Point Protocol Daemon or PPPD. PPP is the protocol used for establishing internet links over dial-up modems, DSL connections, and many other types of point-to-point links. The PPPD daemon works together with the kernel PPP driver to establish and maintain a PPP link with another system (called the peer) and to negotiate Internet Protocol (IP) addresses for each end of the link. PPPD can also authenticate the peer and/or supply authentication information to the peer. As will be appreciated, PPP can be used with other network protocols besides IP.

The communications initiation application controls the card and, inter alia, provides address information to the card. The peers file includes connection information to be used for the connection, such as the identity of the port (e.g., serial port name), the size of the window for used for input/output (e.g., desired baud rate for the serial device), whether the connection is to be persistent, the connect script used to connect the card, disconnect script used to disconnect the card, and other options such as default rate, speed, ttyname, crtscts, lock, mru, mtu, and passive.

The next file in the chain is the chat file, which contains the command set required, for the particular card vendor and type, to establish the connection. The command set typically is an ordered series of queries to the card and response definitions provided by the card in response to the queries.

The final file in the chain sequence is the pap-secrets file, which contains a username and password.

Another file in the sequence is the ip-up.local file, which, after the link is established with the network, is used by the modem to select a Domain Name Service or DNS server and, inter alia, starts a time synchronization sequence with a universal time server to maintain synchronization between the system clock 936 and universal time.

In step 1012, the manager 932 invokes the connection monitor 928, which in turn invokes the connection manager 924 to establish the connection with the network.

In step 1016, the card sets up the connection. Generally, the card receives an identifier or address (e.g., telephone number, ESN or other) from the communication initiation application. The identifier or address is associated with the card and informs the network that the card is associated with an authorized wireless device. In the configuration, the network sets up a serial connection with the SMD followed by a handshake and authentication procedure between the card and network. Other links are also possible. After the link is up, the network assigns an IP address to the SMD. As will be appreciated, certain networks, such as Sprint and Verizon, automatically assign and provide a link with a DNS server address while others, such as Cingular, fail to provide a link with a DNS server address. For the latter networks, the DNS server address is included in the connection manager files. Regarding authentication, some network services, such as Cingular, use the same username and password for a number of network cards of the same type. Others, such as Sprint, include the post-card-activation authentication information in the card itself, so non pap-secrets file is needed in the connection manager.

Figure 11:
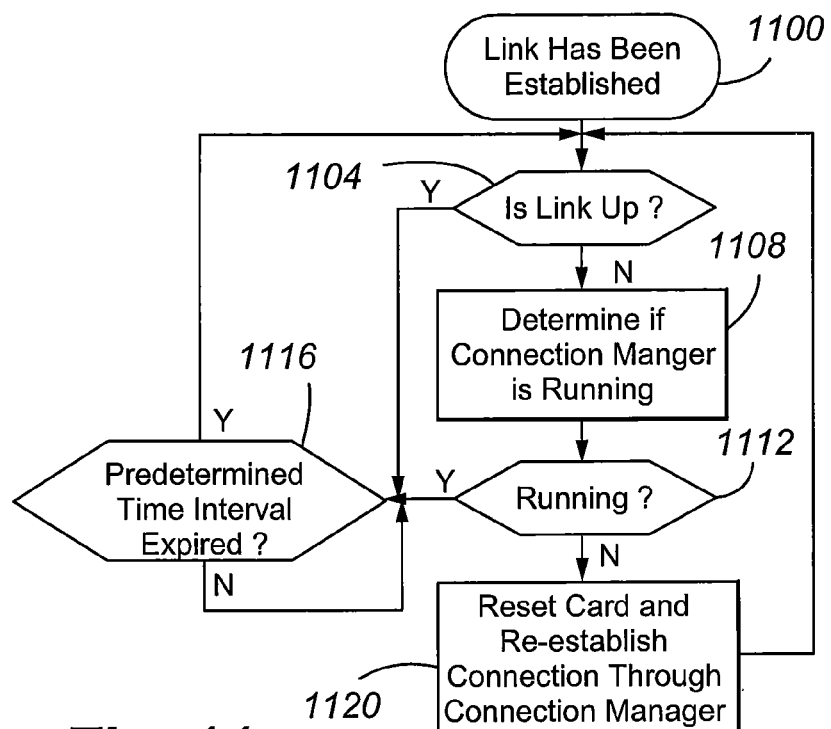
FIG. 11 is a flowchart depicting an operational mode of the modem system according to an embodiment of the present invention.
Figure 12:
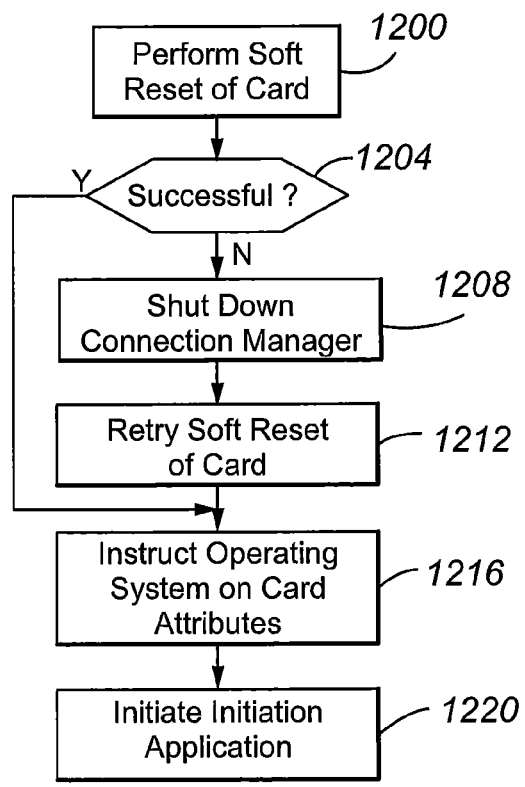
FIG. 12 is a flowchart depicting an operational mode of the modem system according to an embodiment of the present invention.

FIGS. 11 and 12 depict the operation of the connection monitor 928a-x after a link has been established.

The process starts with the establishment of a link in step 1100.

In decision diamond 1104, the connection monitor 928a-x determines whether or not the link is up. The performance of this step depends on the air interface used by the network. With most air interfaces such as the current CDMA services, the monitor 928a-x checks locally to determine if the monitor is up. If communication is lost with the network, the link is not up. In that event, the card automatically informs the manager 932 that the link is down. The system manager 932, in response, removes the file for the link. In the Linux operation system, the manager 932 removes a point-to-point protocol (ppp) link from the route file when it is informed that a link is disconnected. If there is a ppp entry in the route file, the link is still up. If there is no ppp entry in the route file, the link is down. The monitor 928 can thus determine readily whether or not the link is up.

With certain connection cards on the GPRS air interfaces, the card does not inform the manager that the link has been disconnected, and the ppp entry remains in the route file even when the link is down (the "ppp Exception"). In this case, the monitor functions differently and forwards a query (e.g., DNS lookup request) to the DNS server. If a response is received, the monitor knows that the link is still up. If no response is received from the DNS server, the monitor knows that the link is down.

If the link is up, the monitor proceeds to decision diamond 1116 and repeats the foregoing operation after a predetermined time interval.

If the link is down, the monitor proceeds to step 1108. In step 1108, the monitor determines if the connection manager (i.e., the communications initiation application [e.g., PPPD]) is running. Stated another way, the monitor determines whether the communications initiation application is configured for a persistent connection. When so configured, the communications initiation application will retry automatically to reestablish the connection with the network. Accordingly, when the communications initiation application is configured for a persistent connection the monitor proceeds to decision diamond 1116 as there is no need for it to effect reestablishment of the connection. When the communications initiation application is not configured for a persistent connection, the monitor proceeds to step 1120 in which it resets the card and effects reestablishment of the connection. In one configuration, the monitor simulates user removal and reinsertion of the card into the slot.

FIG. 12 depicts, in more detail, the process of step 1120 in the case of the "ppp Exception" noted above, that is used to reset the card in the event of a lost link.

In step 1200, the monitor 928a-x performs a soft reset of the card. The soft reset is performed by the manager 932, which removes power to the slot and then reapplies it. Some cards, however, do not permit the manager to remove power from the slot.

In decision diamond 1204, the monitor 928a-x determines whether the manager 932 was successful in removing and reapplying power to the slot. When the soft reset has not been successful, the monitor 928a-x, in step 1208 shuts down the communications initiation application 930. Because the application is shut down during operation or "hard killed", the manager 932 removes remnants from the application's operation to ensure that the remnants do not interfere with the ensuing steps of the process.

After removal of the remnants, the monitor 928a-x, in step 1212, repeats the soft reset of the card.

When the soft reset is successful in decision diamond 1204 or after the soft reset of step 1212, the monitor 928a-x, in step 1216, provides the card attributes to the manager 932. Primarily, the attributes pertain to how the SMD 900 is to recognize the card, e.g., as a serial or Universal Serial Bus or USB device as the manager 932 will need to set up a serial or USB connection, as appropriate. The communications initiation application is configured for serial connections. When the card is a USB device, the manager 932 will recognize automatically the card as a USB device, and, when the card is a serial device, the manager 932 will recognize automatically the card as a serial device. So that the card will interface with the communications initiation application, the monitor 928a-x instructs the manager 932 to set the card attributes for a serial device. When the card is natively a serial device, the monitor 928a-x provides the manager 932 with a baud rate for the serial connection. There is no need to provide a baud rate when the card is natively a USB device as the baud rate for the connection with the USB card will be set automatically by the manager 932 at a sufficiently high rate.

The connection may be terminated voluntarily by the SMD 900 in response to a set of predetermined trigger events. One trigger event is a command by the user. Another trigger is when the received signal strength from the network falls below a selected threshold. Signal strength may be measured using the mechanisms currently used by cell phones to measure and report the signal strength to the user, even though the user has not yet placed a call. Yet another trigger is one or more selected quality of service (QoS) parameters falling below a corresponding predetermined threshold. Exemplary QoS parameters include packet loss, jitter, latency, etc. To prevent automatic reestablishment of the connection, the manager 932 can prevent the monitor 928 and communications initiation application from running. Alternatively, the manager 932 can permit the monitor 928 and communications initiation application to run in an attempt to reestablish the connection. Alternatively, the manager 932 can permit the monitor 928 and communications initiation application to run but select a different one of the cards (and a different network) for the connection attempt. In this alternative, the SMD 900 will move from network to network in response to variations in the health of the established link.

Data collection by the SMD 900 may be periodic or continuous. Periodic data collection may be based on one or more trigger events, such as the passage of a selected time interval, passage of a given number of data entries (either in total or sorted by parameter), detection of a change in one or more selected state parameters or variables, or receipt of a data transmission command by a user. When data collection is to be transmitted and the connection is either down or up but unhealthy, the SMD buffers the data in the memory 940 while the monitor 928 attempts to reestablish the connection with the same or a different network. When the connection is reestablished, the data is transmitted via the network to the remote server.

To conserve bandwidth, the manager may filter by a filter 1628 (FIG. 16) the collected data that is transmitted to the remote server. The data may be filtered on a number of criteria, such as duplication or type. Regarding duplication when the data has not changed since a prior transmission, the data would not have to be resent. Only data that has changed since the prior transmission could be resent. Regarding data type, certain types of data may be sent automatically to the remote server while other types of data may only be sent in response to a trigger event, such as a change in the data or detection of an alarm condition of a vehicular state parameter, or a manual trigger via a touchscreen input.

A number of variations and modifications of the invention can be used. It would be possible to provide for some features of the invention without providing others.

For example in one alternative embodiment, the SMD 900 is configured for remote software upgrades, particularly for firmware. The software is not only that resident in the SMD 900 but also for an ancillary component, such as the sensors 916. The upgrade is normally started by the operator of the vehicle commanding the SMD 900, via the user interface 920, to initiate a software upgrade. The manager 932 contacts the remote server and checks for an appropriate upgrade. As part of the interaction, the manager 932 may need to provide authentication information, such as the name 1616 of the SMD 900, a username and a password, or an authentication code. If an upgrade is located, the SMD 900 pulls the upgrade from the server 824 via the selected network. The manager 932 then proceeds to install the upgrade on the respective SMD 900 or ancillary component.

In another alternative embodiment, the SMD 900 is configured to detect automatically a network card 904 based on vendor and type and select automatically the corresponding set of connection manager 924a-x and monitor 928a-x. When a card is inserted or otherwise selected by a user, the manager 932 accesses the vendor code and product identifier resident on the card and retrieves a lookup table, such as that depicted in FIG. 13, from memory 940. The manager 932 maps the vendor code and product identifier set received from the card to receive an identifier for the corresponding set of connection manager 924a-x and monitor 928a-x. In one configuration, the identifier is a memory address or pointer to one or more selected files in the corresponding set. Because in one configuration the connection manager 924a-x files are daisy-chained to the connection monitor 928a-x, the identifier can be a pointer or memory address of the connection monitor 928a-x only.

In another alternative embodiment, the SMD is used in stationary roadside applications to collect various types of information. For example, in one configuration, the data collected can be the speed, volume and/or occupancy of passing vehicles. In another configuration, vehicle identification information, such as a license plate number or license plate image, can also be sent with the speed of the identified vehicle. In another embodiment, photos of mountain passes, intersections, or other locations can be periodically sent back to the server. The collected data is transmitted to a server of a central data processing facility. In this configuration, the SMD can be either connected to power or be collocated with an on board power source, which could be a generator or a solar powering array. The data may be transmitted wirelessly or over a fiber network to the central data processing facility.

In yet another alternative embodiment, the SMD uses operating systems other than Linux, such as a Microsoft™ operating system.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The present invention, in various embodiments, includes components, methods, processes, systems and/or apparatus substantially as depicted and described herein, including various embodiments, subcombinations, and subsets thereof.

Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    (a) receiving over a wireless cellular network, from a plurality of snow maintenance vehicles and by a server, a plurality of sets of collected information, each of the collected sets of information comprising a snow maintenance vehicle physical location and at least one of weather and road conditions in an area of the respective snow maintenance vehicle;
    (b) processing, by the server, the received collected information to (i) provide a map associated with a physical location of a selected snow maintenance vehicle and (ii) determine an instruction for an operator of the selected snow maintenance vehicle; and
    (c) providing, over the wireless cellular network, the map and an operator instruction to the selected snow maintenance vehicle of the plurality of snow maintenance vehicles, wherein the map is visually displayed, by a touch screen monitor, to the operator and wherein the operator instruction to the selected snow maintenance vehicle operator comprises one or more of a dispatch command, an alarm based on a temporal trend in weather conditions, an alarm based on a difference in weather conditions, an alarm based on a temporal trend in road conditions, an alarm based on a difference in road conditions, a snow plow setting, a mixture of materials being applied to a road surface, and an amount of materials being applied to the road surface.

2. The method of claim 1, wherein the operator instruction comprises one or more of an alarm based on a temporal trend in weather conditions, an alarm based on a difference in weather conditions, an alarm based on a temporal trend in road conditions, and an alarm based on a difference in road conditions, wherein the physical location is a Global Positioning System ("GPS")-based location, wherein the GPS-based location is received by the modem from a GPS module, wherein the GPS-based location is a current and/or recorded snow maintenance vehicle physical location, and wherein each of the sets of collected information comprise a unique identifier associated with the respective modem, the unique identifier being different from a modem IP address.

3. The method of claim 1, wherein the map is generated from the plurality of sets of collected information and wherein the map depicts snow maintenance vehicle physical locations of each of the plurality of snow maintenance vehicles and the at least one of weather and road conditions in an area of each snow maintenance vehicle.

4. The method of claim 3, wherein the map comprises an icon for each of the plurality of snow maintenance vehicles, a respective map location of each icon depicting a physical location of the corresponding snow maintenance vehicle, and wherein each icon is associated with text information describing a state of the corresponding snow maintenance vehicle.

5. The method of claim 4, wherein the state of the corresponding snow maintenance vehicle comprises at least one of a snow maintenance vehicle identifier, direction of snow maintenance vehicle travel, snow maintenance vehicle speed, status of a GPS signal from the snow maintenance vehicle, and timestamp of last data update for the snow maintenance vehicle.

6. The method of claim 4, wherein an appearance of the icon denotes a corresponding one of a plurality of different possible states of the corresponding snow maintenance vehicle with differing icon appearances corresponding to differing snow maintenance vehicle states.

7. The method of claim 6, wherein the appearance is color and wherein the color indicates that the snow maintenance vehicle is one of active, inactive, and out-of-wireless range.

8. The method of claim 3, wherein the map provides a trace route for each of the plurality of snow maintenance vehicles.

9. The method of claim 1, wherein the operator instruction comprises one or more of a snow plow setting, a mixture of materials being applied to a road surface, and an amount of materials being applied to the road surface, wherein the map is provided, over the wireless cellular network, in a markup language format, wherein the at least one of weather conditions and road conditions is weather conditions, and wherein the weather conditions comprise a plurality of temperature, humidity, wind speed, wind direction, wind chill, and precipitation type.

10. The method of claim 1, wherein the map is provided, over the wireless cellular network, in a markup language format, wherein the at least one of weather conditions and road conditions is road conditions, and wherein the road conditions comprise one or more of icy, slushy, snow-packed, frosty, wet, and dry.

11. The method of claim 6, wherein the snow maintenance vehicle state comprises a plurality of a snow plow setting, a mixture of material being applied to a selected surface, and an amount of material being applied to the selected surface.

12. The method of claim 6, wherein the snow maintenance vehicle state comprises video images of the snow maintenance vehicle's exterior environment.

13. A method, comprising:
    (a) sending, over a wireless cellular network, from an Internet Protocol ("IP") address of a modem of a selected snow maintenance vehicle, and to a server, a set of collected information, the set of collected information comprising a physical location of the selected snow maintenance vehicle, at least one of weather and road conditions in an area of the selected snow maintenance vehicle, and a unique identifier associated with the modem, the unique identifier being different from the modem IP address;

(b) receiving, at the modem and from the server, a map and an operator instruction based on the set of collected information (c) displaying, by a touch screen monitor and to the operator, the map; and (d) providing, to the operator, the operator instruction the operator instruction comprising one or more of a dispatch command, an alarm based on a temporal trend in weather conditions, an alarm based on a difference in weather conditions, an alarm based on a temporal trend in road conditions, an alarm based on a difference in road conditions, a snow plow setting, a mixture of materials being applied to a road surface, and an amount of materials being applied to the road surface.

14. The method of claim 13, wherein the operator instruction comprises one or more of an alarm based on a temporal trend in weather conditions, an alarm based on a difference in weather conditions, an alarm based on a temporal trend in road conditions, and an alarm based on a difference in road conditions, wherein the physical location is a Global Positioning System ("GPS")-based location and wherein the GPS-based location is received by the modem from a GPS module and wherein the GPS-based location is a current and/or recorded snow maintenance vehicle physical location.

15. The method of claim 13, wherein the map is generated from the set of collected information and wherein the map depicts snow maintenance vehicle physical locations of each of a plurality of snow maintenance vehicles, including the selected snow maintenance vehicle, and the at least one of weather and road conditions in an area of each snow maintenance vehicle.

16. The method of claim 15, wherein the map comprises an icon for each of the plurality of snow maintenance vehicles, a respective map location of each icon depicting a physical location of the corresponding snow maintenance vehicle, and wherein each icon is associated with text information describing a state of the corresponding snow maintenance vehicle.

17. The method of claim 16, wherein the state of the corresponding snow maintenance vehicle comprises at least one of snow maintenance vehicle identifier, direction of snow maintenance vehicle travel, snow maintenance vehicle speed, status of a GPS signal from the snow maintenance vehicle, and timestamp of last data update for the snow maintenance vehicle.

18. The method of claim 16, wherein an appearance of the icon denotes a corresponding one of a plurality of different possible states of the corresponding snow maintenance vehicle with differing icon appearances corresponding to differing snow maintenance vehicle states.

19. The method of claim 18, wherein the appearance is color and wherein the color indicates that the snow maintenance vehicle is one of active, inactive, and out-of-wireless range.

20. The method of claim 15, wherein the map provides a trace route for each of the plurality of snow maintenance vehicles.

21. The method of claim 13, wherein the operator instruction comprises one or more of a snow plow setting, a mixture of materials being applied to a road surface, and an amount of materials being applied to the road surface, wherein the map is provided, over the wireless cellular network, in a markup language format, wherein the at least one of weather conditions and road conditions is weather conditions, and wherein the weather conditions comprise a plurality of temperature, humidity, wind speed, wind direction, wind chill, and precipitation type.

22. The method of claim 13, wherein the map is provided, over the wireless cellular network, in a markup language format, wherein the at least one of weather conditions and road conditions is road conditions, and wherein the road conditions comprise one or more of icy, slushy, snow-packed, frosty, wet, and dry.

23. The method of claim 18, wherein the snow maintenance vehicle state comprises a plurality of snow plow setting, mixture of material being applied to a selected surface, and amount of material being applied to the selected surface.

24. The method of claim 18, wherein the snow maintenance vehicle state comprises video images of the snow maintenance vehicle's exterior environment.

25. The method of claim 13, further comprising:

(d) in response to engine shut off, delaying, by a DC voltage regulator and sequencer, termination of power to the modem to enable orderly initiation of modem shut down.

26. A method, comprising:

(a) receiving, from an operator of a snow maintenance vehicle and via a touch screen monitor, information comprising a plurality of a current weather condition, a current road condition, a snow plow setting, a mixture of material being applied to a road surface, and an amount of material being applied to the road surface (b) obtaining a physical location of the snow maintenance vehicle;

(c) determining that at least one of a received signal strength from a cellular network and a Quality of Service ("QoS") parameter is not acceptable;

(d) buffering the received information when the at least one of a received signal strength from a cellular network and a QoS parameter is not acceptable;

(e) when the at least one of a received signal strength from a cellular network and a QoS parameter is acceptable, sending, by the modem, from an Internet Protocol ("IP") address of the modem, and over a cellular network, the received information and physical location to an electronic address associated with a remote server;

(f) in response to sending the received information and physical location, receiving, by the modem and from the remote server, an instruction to the snow maintenance vehicle operator, the instruction comprising one or more of a dispatch command, an alarm based on a temporal trend in weather conditions, an alarm based on a difference in weather conditions, an alarm based on a temporal trend in road conditions, an alarm based on a difference in road conditions, a snow plow setting, a mixture of materials being applied to a road surface, and an amount of materials being applied to the road surface.

27. The method of claim 26, wherein the IP address is received, by the modem from a domain name server of a cellular network, wherein the physical location is a set of location coordinates received from a Global Positioning System ("GPS") sensor, and wherein the determining step (c) comprises:

(C1) forwarding, by the modem, a query to an IP address of the domain name server and applying the following rules;

(C2) when a response is received from the domain name server, determining that the at least one of a received signal strength from a cellular network and a QoS parameter is acceptable; and (C3) when no response is received from the domain name server, determining that the at least one of a received signal strength from a cellular network and a QoS parameter is not acceptable.

28. The method of claim 27, wherein the at least one of a received signal strength from a cellular network and a QoS parameter is not acceptable and further comprising:

(C4) determining, by the modem, whether a communications initiation application is configured for a persistent connection and applying the following rules;

(C5) when the communications initiation application is configured for a persistent connection, allowing, by the modem, the communications initiation application to reestablish a connection with the server; and (C6) when the communications initiation application is not configured for a persistent connection, resetting logic and related parameters required for access to the wireless network to effect reestablishment of the connection with the server.

29. The method of claim 26, wherein the modem sends, along with the received information, a unique identifier associated with the snow maintenance vehicle, the unique identifier being different from the modem IP address.

30. The method of claim 26, wherein a combination DC voltage regulator and sequencer provide key on/off functionality with delayed power-on to provide extended minimal voltage drain upon start and delayed power-off to provide extended session status with restart and/or orderly shut-down of the modem and whatever functionality is then active.

31. The method of claim 26, wherein the operator instruction comprises one or more of an alarm based on a temporal trend in weather conditions, an alarm based on a difference in weather conditions, an alarm based on a temporal trend in road conditions, and an alarm based on a difference in road conditions and wherein the modem is programmable, comprises an operating system, and provides markup language interfaces for the transfer and receipt of information and instructions.

32. The method of claim 26, wherein the modem comprises a connection manager to establish wireless connections and a connection monitor to monitor at least one network state parameter, the network state parameter being one or more of a signal strength over the cellular network, packet loss, jitter, and latency and, when the at least one network state parameter is not acceptable, to disconnect the connection.

33. The method of claim 26, wherein the operator instruction comprises one or more of a snow plow setting, a mixture of materials being applied to a road surface, and an amount of materials being applied to the road surface and wherein the modem comprises a filter operable to remove duplicated information and send only information that has changed since a prior transmission and/or information outside of set or calculated parameters.

34. A snow maintenance vehicle, comprising:
a touch screen monitor operable to receive, from a snow maintenance vehicle operator, information comprising a plurality of a current weather condition, a current road condition, a snow plow setting, a mixture of a material being applied to a road surface, and an amount of the material being applied to the road surface; and
a modem operable to: (a) obtain a physical location of the snow maintenance vehicle; (b) determine that at least one of a received signal strength from a cellular network and a Quality of Service ("QoS") parameter is not acceptable; (c) buffer the received information when the at least one of a received signal strength from a cellular network and a QoS parameter is not acceptable; (d) when the at least one of a received signal strength from a cellular network and a QoS parameter is acceptable, send, from an Internet Protocol ("IP") address of the modem and over a cellular network, the received information and physical location to an electronic address associated with a remote server; and (d) in response to sending the received information and physical location, receive, at the modem IP address and from the remote server, an instruction to the snow maintenance vehicle operator, the instruction comprising one or more of a dispatch command, an alarm based on a temporal trend in weather conditions, an alarm based on a difference in weather conditions, an alarm based on a temporal trend in road conditions, an alarm based on a difference in road conditions, a snow plow setting, a mixture of materials being applied to a road surface, and an amount of materials being applied to the road surface.

35. The vehicle of claim 34, wherein the IP address is received, by the modem from a domain name server of a cellular network, wherein the physical location is a set of location coordinates received from a Global Positioning System ("GPS") sensor, and wherein the determining operation (b) comprises:

(B1) forwarding, by the modem, a query to an IP address of the domain name server and applying the following rules;

(B2) when a response is received from the domain name server, determining that the at least one of a received signal strength from a cellular network and a QoS parameter is acceptable; and (B3) when no response is received from the domain name server, determining that the at least one of a received signal strength from a cellular network and a QoS parameter is not acceptable.

36. The vehicle of claim 35, wherein the at least one of a received signal strength from a cellular network and a QoS parameter is not acceptable and further comprising:

(B4) determining whether a communications initiation application is configured for a persistent connection and applying the following rules;

(B5) when the communications initiation application is configured for a persistent connection, allowing the communications initiation application to reestablish a connection with the server; and (B6) when the communications initiation application is not configured for a persistent connection, resetting logic and related parameters required for access to the wireless network to effect reestablishment of the connection with the server.

37. The vehicle of claim 34, wherein the modem sends, along with the received information, a unique identifier associated with the snow maintenance vehicle, the unique identifier being different from the modem IP address.

38. The vehicle of claim 34, wherein a combination DC voltage regulator and sequencer provides key on/off functionality with delayed power-on to provide extended minimal voltage drain upon start and delayed power-off to provide extended session status with restart and/or orderly shut-down of the modem and whatever functionality is then active.

39. The vehicle of claim 34, wherein the operator instruction comprises one or more of an alarm based on a temporal trend in weather conditions, an alarm based on a difference in weather conditions, an alarm based on a temporal trend in road conditions, and an alarm based on a difference in road conditions and wherein the modem is programmable comprises an operating system, and provides markup language interfaces for the transfer and receipt of information and instructions.

40. The vehicle of claim 34, wherein the modem comprises a connection manager to establish wireless connections and a connection monitor to monitor at least one network state parameter, the network state parameter being one or more of a signal strength over the cellular network, packet loss, jitter, and latency and, when the at least one network state parameter is not acceptable, to disconnect the connection.

41. The vehicle of claim 34, wherein the operator instruction comprises one or more of a snow plow setting, a mixture of materials being applied to a road surface, and an amount of materials being applied to the road surface and wherein the modem comprises a filter operable to remove duplicated information and send only information that has changed since a prior transmission and/or information outside of set or calculated parameters.

42. A system, comprising:
   (a) a server operable to: (i) communicate wirelessly, over a wireless cellular network, with a modem in each of a plurality of snow maintenance vehicles operated by a plurality of different governmental entities; (ii) obtain, for each snow maintenance vehicle, information comprising the current snow maintenance vehicle physical location and at least one of a weather condition and a road condition in the vicinity of the snow maintenance vehicle, (iii) provide, to each snow maintenance vehicle, at least one of (A) a snow maintenance vehicle operator instruction comprising one ore more of a dispatch command, a snow plow setting, a mixture of materials being applied to a road surface, and an amount of materials being applied to the road surface and (B) an alarm to at least one of the snow maintenance vehicle operator and an automated component in the snow maintenance vehicle, (iv) generate, for each governmental entity, a map, and (v) provide, to each of the modems, the at least one of (A) a snow maintenance vehicle operator instruction and (B) an alarm and a selected map for display to an operator of the respective snow maintenance vehicle, the selected map being for the governmental entity employing the operator of the respective snow maintenance vehicle; and
   (b) at least one database operable to store, for each snow maintenance vehicle and for each governmental entity, respective information collected by the server.

43. The system of claim 42, wherein the at least one of (A) a snow maintenance vehicle operator instruction and (B) an alarm is an alarm, wherein the alarm is at least one of an alarm based on a temporal trend in weather conditions, an alarm based on a difference in weather conditions, an alarm based on a conditions, wherein the physical location is a set of Global Positioning System ("GPS") coordinates, wherein each snow maintenance vehicle comprises a respective GPS location unit to provide a current snow maintenance vehicle location, and wherein the current snow maintenance vehicle physical location is sent, by each snow maintenance vehicle, to the server to be used in generation of the map.

44. The system of claim 42, wherein the server generates, using obtained information, the map, for a selected governmental entity, showing an icon associated with each of the snow maintenance vehicles currently in operation for that selected governmental entity, with each icon indicating a current physical location and at least one of a status of the corresponding snow maintenance vehicle, road conditions in the vicinity of the snow maintenance vehicle, and weather conditions in the vicinity of the snow maintenance vehicle.

45. The system of claim 42, wherein the map comprises an icon for each of the plurality of snow maintenance vehicles, a respective map location of each icon depicting a physical location of the corresponding snow maintenance vehicle, and wherein each icon is associated with text information describing a state of the corresponding snow maintenance vehicle.

46. The system of claim 45, wherein the at least one of (A) a snow maintenance vehicle operator instruction and (B) an alarm is a snow maintenance vehicle operator instruction, wherein the snow maintenance vehicle operator instruction is at least one of a snow plow setting, a mixture of materials being applied to a road surface, and an amount of materials being applied to the road surface, wherein the state of the corresponding snow maintenance vehicle comprises at least one of snow maintenance vehicle identifier, direction of snow maintenance vehicle travel, snow maintenance vehicle speed, status of a GPS signal from the snow maintenance vehicle, and timestamp of last data update for the snow maintenance vehicle.

47. The system of claim 45, wherein an appearance of the icon denotes a corresponding one of a plurality of different possible states of the corresponding snow maintenance vehicle with differing icon appearances corresponding to differing snow maintenance vehicle states.

48. The system of claim 47, wherein the appearance is color and wherein the color indicates that the snow maintenance vehicle is one of active, inactive, and out-of-wireless range.

49. The system of claim 44, wherein the map provides a trace route for each of a set of the plurality of snow maintenance vehicles.

50. The method of claim 26, wherein the plurality of current weather conditions, road conditions, snow plow setting, mixture of material being applied to a road surface, and amount of material being applied to the road surface is collected by the touch screen by providing the snow maintenance vehicle operator with menu options, the menu options comprising a plurality of raining, snowing, blowing snow, foggy, clear, overcast, icy road, slushy road, snow-packed road, frosty road, wet road, dry road, snow maintenance vehicle position, snow plow orientation, mixture of material being applied to the road, and amount of material being applied to the road.

* * * * *